United States Patent
Malayath et al.

(10) Patent No.: US 7,606,427 B2
(45) Date of Patent: Oct. 20, 2009

(54) EFFICIENT RATE CONTROL TECHNIQUES FOR VIDEO ENCODING

(75) Inventors: Narendranath Malayath, San Diego, CA (US); Stephen Molloy, Carlsbad, CA (US); Yong Chang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 953 days.

(21) Appl. No.: 11/019,331

(22) Filed: Dec. 21, 2004

(65) Prior Publication Data

US 2006/0018552 A1    Jan. 26, 2006

Related U.S. Application Data

(60) Provisional application No. 60/586,963, filed on Jul. 8, 2004.

(51) Int. Cl.
*G06K 9/36* (2006.01)
*G06K 9/46* (2006.01)

(52) U.S. Cl. ............... 382/232; 382/233; 382/236; 382/238; 382/239; 382/251; 375/240.15; 375/240.24; 375/240.23

(58) Field of Classification Search ............ 382/232, 382/233, 236, 238, 239, 248, 251; 375/240.02, 375/240.2, 240.03, 240.15, 240.24, 240.12, 375/240.14, 240.23, 240.01

See application file for complete search history.

(56) References Cited

U.S. PATENT DOCUMENTS

| | | | |
|---|---|---|---|
| 5,781,788 A * | 7/1998 | Woo et al. ............ 712/1 |
| 6,891,889 B2 * | 5/2005 | Kim et al. ............ 375/240.03 |
| 7,046,729 B2 * | 5/2006 | Yu et al. ............ 375/240.12 |
| 2002/0015092 A1 * | 2/2002 | Feder et al. ............ 348/14.13 |
| 2002/0085633 A1 | 7/2002 | Kim et al. |
| 2002/0118746 A1 | 8/2002 | Kim et al. |
| 2002/0122482 A1 | 9/2002 | Kim et al. |
| 2003/0072364 A1 | 4/2003 | Kim et al. |
| 2004/0037357 A1 | 2/2004 | Bagni et al. |
| 2004/0042548 A1 * | 3/2004 | Yu et al. ............ 375/240.03 |
| 2004/0105491 A1 | 6/2004 | Bayazit |
| 2004/0105586 A1 | 6/2004 | Bayazit |
| 2005/0094870 A1 * | 5/2005 | Furukawa et al. ............ 382/155 |

OTHER PUBLICATIONS

He, Z. et al.: "A Linear Source Model and a Unified Rate Control Algorithm for DCT Video Coding," IEEE Transactions on Circuits and Systems for Video Technology, vol. 12. No. 11, pp. 970-982 (Nov. 2002).

* cited by examiner

*Primary Examiner*—Vikkram Bali
*Assistant Examiner*—Ali Bayat
(74) *Attorney, Agent, or Firm*—George C. Pappas; Matthew J. Evans

(57) ABSTRACT

This disclosure describes rate control techniques that can improve video encoding. In particular, the described rate control techniques exploit relationships between the number of bits encoded per frame and the number of non-zero coefficients of the video blocks after quantization. The number of number of non-zero coefficients of the video blocks after quantization is referred to as rho ($\rho$). The value of $\rho$ is generally proportional to the number of bits used in the video encoding. This disclosure utilizes a relationship between $\rho$ and a quantization parameter (QP) in order to achieve rate controlled video encoding. More specifically, this disclosure provides techniques for generating a lookup table (LUT) that maps values of $\rho$ to different QPs.

40 Claims, 13 Drawing Sheets

EFFICIENT RATE CONTROL TECHNIQUES FOR VIDEO ENCODING

The present application claims the benefit of U.S. Provisional Application Patent No. 60/586,963 filed Jul. 8, 2004.

TECHNICAL FIELD

This disclosure relates to digital video processing and, more particularly, rate controlled encoding of video sequences.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video encoding standards have been established for encoding digital video sequences. The Moving Picture Experts Group (MPEG), for example, has developed a number of standards including MPEG-1, MPEG-2 and MPEG-4. Other standards include the International Telecommunication Union (ITU) H.263 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Furthermore, new standards continue to emerge and evolve, including the ITU H.264 standard and a number of proprietary standards.

Many video encoding standards allow for improved transmission rates of video sequences by encoding data in a compressed fashion. Compression can reduce the overall amount of data that needs to be transmitted for effective transmission of video frames. Most video encoding standards, for example, utilize graphics and video compression techniques designed to facilitate video and image transmission over a narrower bandwidth than can be achieved without the compression.

The MPEG standards and the ITU H.263 and ITU H.264 standards, for example, support video encoding techniques that utilize similarities between successive video frames, referred to as temporal or inter-frame correlation, to provide inter-frame compression. The inter-frame compression techniques exploit data redundancy across frames by converting pixel-based representations of video frames to motion representations. In addition, some video encoding techniques may utilize similarities within frames, referred to as spatial or intra-frame correlation, to further compress the video frames.

In order to support compression, a digital video device typically includes an encoder for compressing digital video sequences, and a decoder for decompressing the digital video sequences. In many cases, the encoder and decoder form an integrated encoder/decoder (CODEC) that operates on blocks of pixels within frames that define the video sequence. In the MPEG-4 standard, for example, the encoder typically divides a video frame to be transmitted into video blocks referred to as "macroblocks." The ITU H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. Other standards may support differently sized video blocks.

For each video block in the video frame, an encoder searches similarly sized video blocks of one or more immediately preceding video frames (or subsequent frames) to identify the most similar video block, referred to as the "best prediction." The process of comparing a current video block to video blocks of other frames is generally referred to as motion estimation. Once a "best prediction" is identified for a video block, the encoder can encode the differences between the current video block and the best prediction. This process of encoding the differences between the current video block and the best prediction includes a process referred to as motion compensation. Motion compensation comprises a process of creating a difference block indicative of the differences between the current video block to be encoded and the best prediction. In particular, motion compensation usually refers to the act of fetching the best prediction block using a motion vector, and then subtracting the best prediction from an input block to generate a difference block.

After motion compensation has created the difference block, a series of additional encoding steps are typically performed to encode the difference block. These additional encoding steps may depend on the encoding standard being used. In MPEG-4 compliant encoders, for example, the additional encoding steps may include an 8×8 discrete cosine transform, followed by scalar quantization, followed by a raster-to-zigzag reordering, followed by run-length encoding, followed by Huffman encoding. An encoded difference block can be transmitted along with a motion vector that indicates which video block from the previous frame was used for the encoding. A decoder receives the motion vector and the encoded difference block, and decodes the received information to reconstruct the video sequences.

A number of rate control techniques have been developed for video encoding. Rate control techniques are particularly important in order to facilitate real-time transmission of video sequences, but may also be used in non-real-time encoding settings. For rate control, the encoding techniques dynamically adjust the number of bits that are encoded per frame. In particular, rate control can restrict the number of bits that are encoded per frame in order to ensure that the video sequence can be effectively encoded at a given rate and transmitted over an allocated bandwidth. If the encoding techniques are not responsive to scene changes of a video sequence, the bit rate for real-time transmission of the video sequence can vary significantly as the scenes change. Therefore, in order to define a substantially constant bit rate, the number of bits per frame are dynamically adjusted during the encoding.

One way to achieve rate controlled encoding is to allow for adjustment of a quantization parameter (QP) during the video encoding process. The QP directly impacts the number of bits that are encoded per second. As the QP increases, less data is preserved and the quality of the video encoding may degrade. As the QP decreases, more data is preserved and the quality of the video encoding improves. However, if the QP is too small, the number of encoded bits per second may exceed an allocated bandwidth, and compromise the ability to transfer the frames within the limited amount of bandwidth. By selecting the QP in a dynamic fashion, the bit rate for transmission of video frames can be made substantially constant.

SUMMARY

This disclosure describes rate control techniques that can improve video encoding. In particular, the described rate control techniques exploit relationships between the number of bits encoded per frame and the number of non-zero coefficients of the video blocks after quantization. The number of non-zero coefficients of the video blocks of the frames after quantization is referred to as rho ($\rho$). The value of $\rho$ is generally proportional to the number of bits used in the video encoding process. This disclosure utilizes a relationship between $\rho$ and a quantization parameter (QP) in order to achieve rate controlled video encoding. More specifically, this disclosure provides techniques for generating a lookup table (LUT) that maps values of $\rho$ to different QPs. QPs can then be selected to achieve a desired encoding rate, which is linearly related to $\rho$. The described techniques can simplify the video encoder and significantly reduce the number of computations required to generate LUTs used in rate controlled video encoding.

This disclosure also describes a video encoding device that implements a rate control technique as described herein. In one embodiment, the video encoding device comprises an encoder that calculates thresholds for un-quantized coefficients of a video block, wherein the thresholds identify when quantized coefficients become non-zero for different quantization parameters (QP's), and generates a $\rho$-QP look-up table (LUT) mapping numbers of non-zero coefficients after quantization ($\rho$'s) to the QP's using the threshold. The video encoding device also includes a memory that stores the $\rho$-QP LUT. In a more specific embodiment, the encoder generates a threshold-QP LUT mapping the thresholds to QP's, and generates the $\rho$-QP LUT using the threshold-QP LUT. In any case, by exploiting the thresholds that identify when quantized coefficients become non-zero for different quantization parameters, the described techniques can significantly simplify the generation of the $\rho$-QP LUT.

These and other techniques described herein may be implemented in a digital video device in hardware, software, firmware, or any combination thereof. If implemented in software, the software may be executed in a digital signal processor (DSP). In that case, the software that executes the techniques may be initially stored in a computer readable medium and loaded and executed in the DSP for effective rate controlled encoding in a digital video device. Additional details of various embodiments are set forth in the accompanying drawings and the description below. Other features, objects and advantages will become apparent from the description and drawings, and from the claims.

DETAILED DESCRIPTION

This disclosure describes rate control techniques that can be used to improve video encoding. The techniques may be used with any of a wide variety of video encoding standards, such as the MPEG-4 standard, the ITU H.263 standard, the ITU H.264 standard, or other standards. Specifically, the techniques exploit relationships between the number of bits encoded per frame (the encoding rate), and the number of non-zero coefficients of the video blocks of the frames after quantization. The number of non-zero coefficients of the video blocks of the frames after quantization is referred to as rho ($\rho$). The value of $\rho$ is generally proportional to the quantization parameter (QP) used in the video encoding. Accordingly, this disclosure utilizes the relationship between $\rho$ and QP in order to achieve rate controlled video encoding. More specifically, this disclosure provides techniques for generating a lookup table (LUT) that maps values of $\rho$ to different QPs. The described techniques can simplify the video encoder and significantly reduce the number of computations required to generate LUTs used in rate controlled video encoding in the $\rho$-domain. A video encoder uses the LUT to select a QP that ensures the desired encoding rate is achieved.

Figure 1:
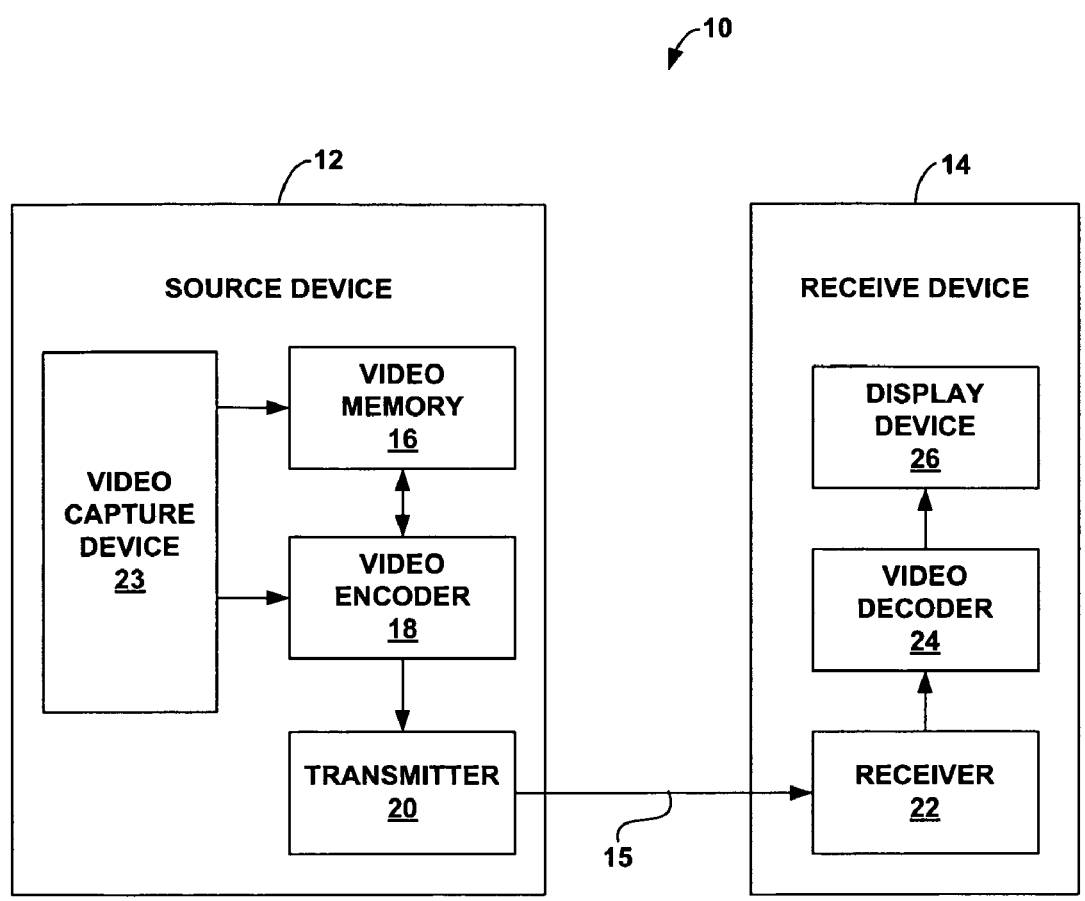
FIG. 1 is a block diagram illustrating an exemplary system in which a source digital video device transmits an encoded sequence of video data to a receive digital video device.

FIG. 1 is a block diagram illustrating an example system 10 in which a source device 12 transmits an encoded sequence of video data to a receive device 14 via a communication link 15. Source device 12 and receive device 14 are both digital video devices. In particular, source device 12 encodes video data consistent with a video standard such as the MPEG-4 standard, the ITU H.263 standard, the ITU H.264 standard, or any of a wide variety of other standards that can make use of rate controlled video encoding. One or both of devices 12, 14 of system 10 implement rate control techniques, as described in greater detail below, in order to improve the video encoding process. Such rate control techniques are particularly useful for real-time transmission of video sequences over a limited bandwidth communication link 15, such as a wireless communication link.

Communication link 15 may comprise a wireless link, a physical transmission line, fiber optics, a packet based network such as a local area network, wide-area network, or global network such as the Internet, a public switched telephone network (PSTN), or any other communication link capable of transferring data. Thus, communication link 15 represents any suitable communication medium, or possibly a collection of different networks and links, for transmitting video data from source device 12 to receive device 14. As mentioned, communication link 15 may have limited bandwidth, making rate control very important for real-time transmission of video sequences over link 15.

Source device 12 may comprise any digital video device capable of encoding and transmitting video data. Source device 12 may include a video memory 16 to store digital video sequences, a video encoder 18 to encode the sequences, and a transmitter 20 to transmit the encoded sequences over communication link 15 to source device 14. Video encoder 18 may include, for example, various hardware, software or firmware, or one or more digital signal processors (DSP) that execute programmable software modules to control the video encoding techniques, as described herein. Associated memory and logic circuitry may be provided to support the DSP in controlling the video encoding techniques.

Source device 12 may also include a video capture device 23, such as a video camera, to capture video sequences and store the captured sequences in memory 16. In particular, video capture device 23 may include a charge coupled device (CCD), a charge injection device, an array of photodiodes, a complementary metal oxide semiconductor (CMOS) device, or any other photosensitive device capable of capturing video images or digital video sequences.

As further examples, video capture device 23 may be a video converter that converts analog video data to digital video data, e.g., from a television, video cassette recorder, camcorder, or another video device. In some embodiments, source device 12 may be configured to transmit real-time video sequences over communication link 15. In that case, receive device 14 may receive the real-time video sequences and display the video sequences to a user. Alternatively, source device 12 may capture and encode video sequences that are sent to receive device 14 as video data files, i.e., not in real-time. Thus, source device 12 and receive device 14 may support applications such as video telecommunication, video clip playback, video mail, or video conferencing, e.g., in a mobile wireless network. Devices 12 and 14 may include various other elements that are not specifically illustrated in FIG. 1.

Receive device 14 may take the form of any digital video device capable of receiving and decoding video data. For example, receive device 14 may include a receiver 22 to receive encoded digital video sequences from transmitter 20, e.g., via intermediate links, routers, other network equipment, and like. Receive device 14 also may include a video decoder 24 for decoding the sequences, and a display device 26 to display the sequences to a user. In some embodiments, however, receive device 14 may not include an integrated display device 14. In such cases, receive device 14 may serve as a receiver that decodes the received video data to drive a discrete display device, e.g., a television or monitor.

Example devices for source device 12 and receive device 14 include servers located on a computer network, workstations or other desktop computing devices, and mobile computing devices such as laptop computers or personal digital assistants (PDAs). Other examples include digital television broadcasting satellites and receiving devices such as digital televisions, digital cameras, digital video cameras or other digital recording devices, digital video telephones such as mobile telephones having video capabilities, direct two-way communication devices with video capabilities, other wireless video devices, and the like.

In some cases, source device 12 and receive device 14 each include an encoder/decoder (CODEC) (not shown) for encoding and decoding digital video data. In particular, both source device 12 and receive device 14 may include transmitters and receivers as well as memory and displays. Many of the encoding techniques outlined below are described in the context of a digital video device that includes an encoder. It is understood, however, that the encoder may form part of a CODEC. In that case, the CODEC may be implemented within hardware, software, firmware, a DSP, a microprocessor, an application specific integrated circuit (ASIC), a field programmable gate array (FPGA), discrete hardware components, or various combinations thereof.

Video encoder 18 within source device 12 operates on blocks of pixels within a sequence of video frames in order to encode the video data. For example, video encoder 18 may execute motion estimation and motion compensation techniques in which a video frame to be transmitted is divided into blocks of pixels (referred to as video blocks). The video blocks, for purposes of illustration, may comprise any size of blocks, and may vary within a given video sequence. As an example, the ITU H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. The use of smaller video blocks in the video encoding can produce better resolution in the encoding, and may be specifically used for locations of video frame that include higher levels of detail. Moreover, video encoder 18 may be designed to operate on 4 by 4 video blocks, and reconstruct larger video blocks from the 4 by 4 video blocks, as needed.

Each pixel in a video block may be represented by various n-bit values, e.g., 8 bits, that defines visual characteristics of the pixel such as the color and intensity in values of chromaticity and luminosity. Each pixel may have one or more 8-bit values for both chromaticity and luminosity. The principles of this disclosure, however, are not limited to the format of the pixels, and may be extended for use with simpler fewer-bit pixel formats or more complex larger-bit pixel formats. The pixels may also be defined in accordance with other color coordinate systems.

For each video block in the video frame, video encoder 18 of source device 12 may perform motion estimation by searching video blocks stored in memory 16 for one or more preceding video frames already transmitted (or a subsequent video frames) to identify a similar video block, referred to as a prediction video block. In some cases, the prediction video block may comprise the "best prediction" from the preceding or subsequent video frame, although this disclosure is not limited in that respect. Video encoder 18 performs motion compensation to create a difference block indicative of the differences between the current video block to be encoded and the best prediction. Motion compensation usually refers to the act of fetching the best prediction video block using a motion vector, and then subtracting the best prediction from an input block to generate a difference block.

After the motion compensation process has created the difference block, a series of additional encoding steps are typically performed to encode the difference block. These additional encoding steps may depend on the encoding standard being used. In MPEG-4 compliant encoders, for example, the additional encoding steps may include an 8×8 discrete cosine transform, followed by scalar quantization, followed by a raster-to-zigzag reordering, followed by run-length encoding, followed by Huffman encoding.

Once encoded, the encoded difference block can be transmitted along with a motion vector that identifies the video block from the previous frame (or subsequent frame) that was used for the encoding. In this manner, instead of encoding each frame as an independent picture, video encoder 18 encodes the difference between adjacent frames. Such techniques can significantly reduce the amount of data that needed to accurately represent each frame of a video sequence.

The motion vector may define a pixel location relative to the upper-left-hand corner of the video block being encoded, although other formats for motion vectors could be used. In any case, by encoding video blocks using motion vectors, the required bandwidth for transmission of streams of video data can be significantly reduced.

In some cases, video encoder 18 can support intra frame encoding, in addition to inter frame encoding. Intra-frame encoding utilizes similarities within frames, referred to as spatial or intra-frame correlation, to further compress the video frames. Intra-frame compression is typically based upon texture encoding for compressing still images, such as discrete cosine transform (DCT) encoding. Intra-frame compression is often used in conjunction with inter-frame compression, but may also be used as an alterative in some implementations.

Receiver 22 of receive device 14 may receive the encoded video data in the form of motion vectors and encoded difference blocks indicative of encoded differences between the video block being encoded and the best prediction used in motion estimation. In some cases, however, rather than sending motion vectors, the difference between the motion vectors and a previously calculated motion vector predictor (MVP) are transmitted. In any case, decoder 24 can perform video decoding in order to generate video sequences for display to a user via display device 26. The decoder 24 of receive device 14 may also be implemented as an encoder/decoder (CODEC). In that case, both source device 12 and receive device 14 may be capable of encoding, transmitting, receiving and decoding digital video sequences.

In accordance with this disclosure, video encoder 18 selects quantization parameters (QPs) in a dynamic fashion in order to effectuate rate controlled encoding. Video encoder generates a lookup table (LUT) on a video block or video frame basis, in order to map values of rho ($\rho$) to the quantization parameters (QPs) used in the video encoding. The quantity $\rho$ represents the number of non-zero coefficients of the video blocks after quantization, and is generally proportional to number of bits used in the video encoding. Accordingly, video encoder 18 utilizes the relationship between $\rho$ and QP in order to achieve rate controlled video encoding. More specifically, video encoder 18 executes techniques for generating a lookup table (LUT) that maps values of $\rho$ to different QPs. As $\rho$ is approximately linearly related to the rate, the $\rho$-QP LUT can be used to select QPs that result in effective rate controlled video encoding. The $\rho$-QP LUT may also be labeled herein as $\rho(QP)$.

Figure 2:
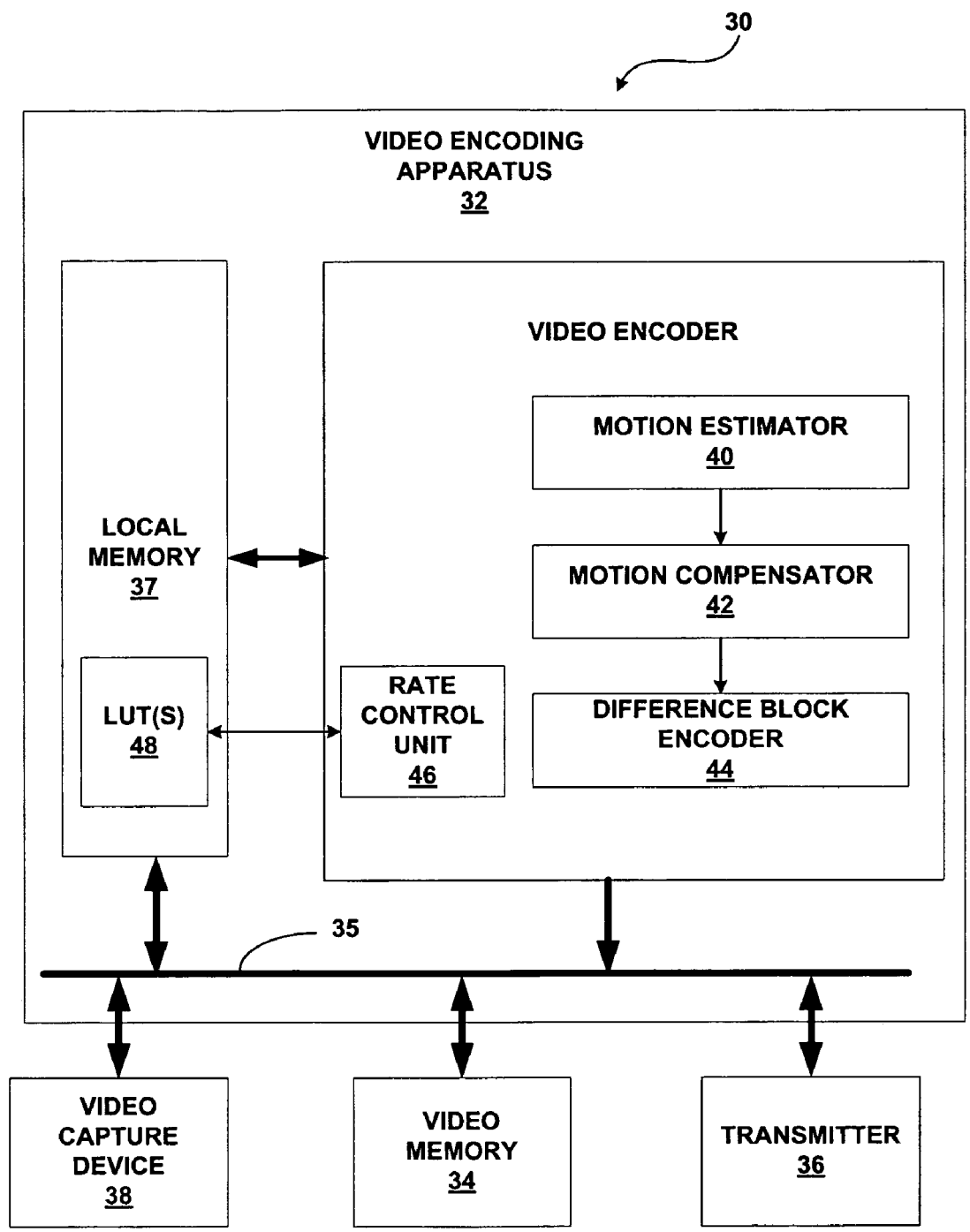
FIG. 2 is an exemplary block diagram of a digital video device according to an embodiment of this disclosure.

FIG. 2 is an exemplary block diagram of a device 30, which may correspond to source device 12. In general, device 30 comprises a digital video device capable of performing the rate controlled encoding techniques as described herein. Device 30 may comply with a video encoding standard such as MPEG-4, ITU H.263, ITU H.264, or another video encoding standard that supports motion estimation and motion compensation techniques for inter-frame video encoding.

As shown in FIG. 2, device 30 includes a video encoding apparatus 32 to encode video sequences, and a video memory 34 to store the video sequences before and after encoding. Device 30 may also include a transmitter 36 to transmit the encoded sequences to another device, and possibly a video capture device 38, such as a video camera, to capture video sequences and store the captured sequences in memory 34. The various elements of device 30 may be communicatively coupled via a communication bus 35. Various other elements, such as intra-frame encoder elements, various filters, or other elements may also be included in device 30, but are not specifically illustrated for simplicity.

Video memory 34 typically comprises a relatively large memory space. Video memory 34, for example, may comprise dynamic random access memory (DRAM), or FLASH memory. In other examples, video memory 34 may comprise a non-volatile memory or any other data storage device.

Video encoding apparatus 32 may comprise a chip set for a mobile radiotelephone, including a combination of hardware, software, firmware, and/or processors or digital signal processors (DSPs). Video encoding apparatus 32 generally includes an encoder 28 coupled to a local memory 37. Local memory 37 may comprise a smaller and faster memory space relative to video memory 34. By way of example, local memory 37 may comprise synchronous random access memory (SRAM). Local memory 37 may comprise "on-chip" memory integrated with the other components of video encoding apparatus 32 to provide for very fast access to data during the processor-intensive encoding process. During the encoding of a given video frame, the current video block to be encoded may be loaded from video memory 34 to local memory 37. A search space used in locating the best prediction may also be loaded from video memory 34 to local memory 37.

The search space may comprise a subset of pixels of one or more of the preceding video frames (or subsequent frames). The chosen subset may be pre-identified as a likely location for identification of a best prediction that closely matches the current video block to be encoded. Moreover, the search space may change over the coarse of motion estimation, if different search stages are used. In that case, the search space may become progressively smaller in terms of the size of the search space, with these later searches being performed at greater resolution than previous searches.

Local memory 37 is loaded with a current video block to be encoded and a search space, which comprises some or all of one or more video frames used in inter-frame encoding. Motion estimator 40 compares the current video block to various video blocks in the search space in order to identify a best prediction. In some cases, however, an adequate match for the encoding may be identified more quickly, without specifically checking every possible candidate, and in that case, the adequate match may not actually be the "best" prediction, albeit adequate for effective video encoding. In general, the phrase "prediction video block" refers to an adequate match, which may be the best prediction.

Motion estimator 40 performs the comparisons between the current video block to be encoded and the candidate video blocks in the search space of memory 37. In some cases, candidate video blocks may include non-integer pixel values generated for fractional interpolation. By way of example, motion estimator 40 may perform sum of absolute difference (SAD) techniques, sum of squared difference (SSD) techniques, or other comparison techniques, in order to define the difference value for the candidate video block. A lower difference value generally indicates that a candidate video block is a better match, and thus a better candidate for use in motion estimation encoding than other candidate video blocks yielding higher difference values.

Ultimately, motion estimator identifies a "best prediction," which is the candidate video block that most closely matches the video block to be encoded. However, it is understood that, in many cases, an adequate match may be located before the best prediction, and in those cases, the adequate match may be used for the encoding. Again, a prediction video block refers to an adequate match, which may be the best prediction.

Once a best prediction is identified by motion estimator 40 for a video block, motion compensator 42 creates a difference block indicative of the differences between the current video block and the best prediction. Difference block encoder 44 may further encode the difference block to compress the difference block, and the encoded difference block can forwarded for transmission to another device, along a motion vector (or the difference between the motion vector and a motion vector predictor) to identify which candidate video block from the search space was used for the encoding. For simplicity, the additional components used to perform encoding after motion compensation are generalized as difference block encoder 44, as the specific components would vary depending on the specific standard being supported. In other words, difference block encoder 44 may perform one or more conventional encoding techniques on the difference block, which is generated as described herein.

The encoding process, including motion estimation and motion compensation is very computationally intensive. However, the number of computations necessary for performing rate control can be limited. In order to perform such rate control, video encoder 28 includes a rate control unit 46. Rate control unit 46 exploits a relationship between the number of bits encoded per frame and the number of non-zero coefficients of the video blocks after quantization. The value of $\rho$, which represents the number of non-zero coefficients of the video blocks after quantization, is generally proportional to the number of bits encoded per frame (and thus the number of bits encoded per second at a constant frame rate). Accordingly, rate control unit 46 utilizes the relationship between p and QP in order to achieve rate controlled video encoding. More specifically, rate control unit 46 generates one or more LUTs 48 in order to map values of $\rho$ to different QPs. QPs can then be selected for desirable values of $\rho$ corresponding to desirable rates for the video encoding.

As described in greater detail below, rate control unit 46 of video encoder 28 calculates thresholds for un-quantized coefficients of a video block, wherein the thresholds identify when quantized coefficients become non-zero for different quantization parameters (QP's). Rate control unit 46 then generates a $\rho$-QP LUT mapping numbers of non-zero coefficients after quantization ($\rho$'s) to the QP's using the threshold. Local memory 37 stores the $\rho$-QP LUT. In a more specific embodiment, rate control unit 46 of video encoder 28 may generate a threshold-QP LUT mapping the thresholds to QP's, and generate the $\rho$-QP LUT using the threshold-QP LUT. LUTs 48 generally represent one or more LUTs, as outlined herein, such as the $\rho$-QP LUT and possibly the threshold-QP LUT used to generate the $\rho$-QP LUT.

Upon generating the $\rho$-QP LUT, video encoder 28 selects a QP for rate controlled video encoding of the video block from the $\rho$-QP LUT. Video encoder 28 then quantizes the coefficients of the video block based on the selected QP and encodes the video block according to an inter-frame video encoding technique, e.g., as outlined above.

The creation of the $\rho$-QP LUT can be performed on a video block basis or a video frame basis. In the former case, video encoder 28 generates different $\rho$-QP LUTs for different video blocks of a video frame and selects a QP for rate controlled video encoding of a given video block using a corresponding $\rho$-QP LUT for the given video block. In the later case, video encoder 28 generates different $\rho$-QP LUTs for different video frames of a video sequence and selects a QP for rate controlled video encoding of video blocks of a given video frame using a corresponding $\rho$-QP LUT for the given video frame.

In video encoding, it is generally desirable to have an accurate rate-distortion model. An accurate rate-distortion model can result in a rate control scheme that not only achieves target bit rate but also yields low variance in the number of bits per frame. A rate control scheme that uses the number of non-zero coefficients ($\rho$) to predict the bit-rate achieves significantly better performance compared to many other rate-control algorithms, particularly algorithms that use a fixed quadratic rate-distortion model. Conventional algorithms that use a fixed quadratic rate-distortion model are referred to herein as conventional baseline methods or the baseline approach.

Fundamentally, $\rho$-domain rate control is based on two simple principles:
1. $\rho$ is linearly related to the number of bits used; and
2. the QP value that yields a particular $\rho$ value can be estimated from the un-quantized transform coefficients.

If R is the number of bits that need to be used on a frame, then the number of non-zero coefficients that should result after quantization is given by the following equation $$R = A\rho + B \qquad \text{Equation 1}$$

Figure 3:
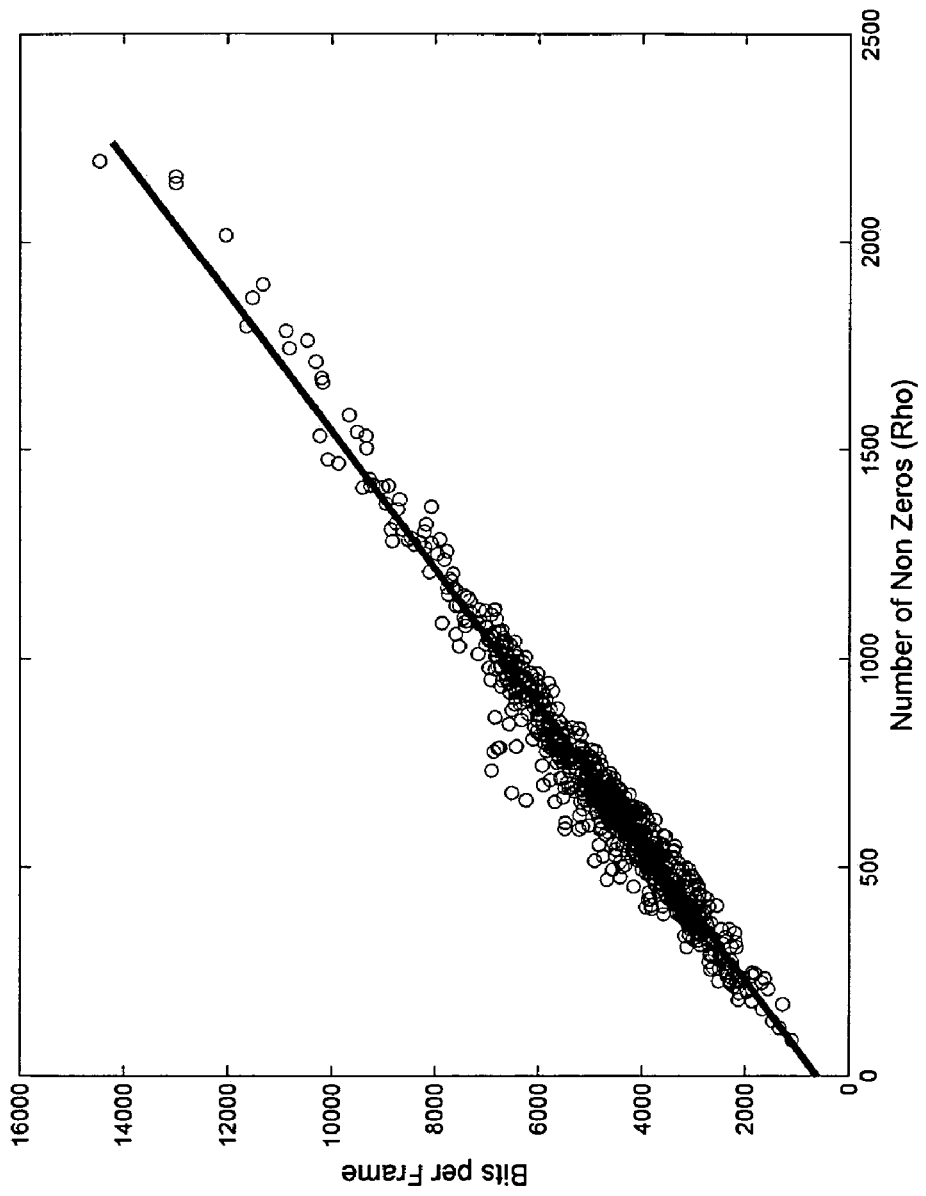
FIG. 3 is a graph illustrating an approximately linear relationship between the number of bits per frame and rho ($\rho$).

In the above Equation 1, the parameter B can be thought of as the bits due to non-texture information and the parameter A can be seen as the average number of bits needed to encode a non-zero coefficient. The parameters A and B can be estimated from the values of R and $\rho$ from the previous frame. From the above Equation 1, if R is given, it is fairly straight-forward to estimate $\rho$. FIG. 3 plots the number of bits used per frame and $\rho$ for different frames. As can be seen from FIG. 3, the relationship between R and $\rho$ is approximately linear.

Accordingly, a rate control technique can select a QP value that yields the desired value of $\rho$. In order to select such a QP value, however, one needs to know the number of non-zero transform coefficients that would result from each allowable QP supported by the standard being used. If the transform coefficients are given by $T_i$ and the quantization step corresponding to QP is given by $S_{QP}$ then the $\rho$-QP table can be given by:

$$\rho(QP) = \sum_{i=0}^{N-1} f(T_i, S_{QP}) \qquad \text{Equation 2}$$

where $$f(T_i, S_{QP}) = 1 \quad \text{iff}\, |T_i + r_{qp}| \geq S_{QP}$$
$$= 0 \quad \text{otherwise}$$

In the above Equation 2, the step size $S_{QP}$ and the rounding factor $r_{qp}$ are dependent on the following factors:
1. The encoding standard, e.g., ITU H.264, MPEG-4 or ITU H.263;
2. Whether the intra-encoding or inter-encoding is being performed; and
3. The coefficient index.

For example, in MPEG-4, inter-coded macroblocks for all coefficients $S_{QP}$ are given by 2QP and $r_{QP}$ is given by $-(QP/2)$. The Equation 2 used for generating the $\rho$-QP table can be implemented with adders and comparators. The table entry $\rho(QP)$ needs to be calculated for all values of QP. QP ranges from 1 to 31 for MPEG-4 and 0 to 51 for H.264. The computations generally need to be repeated for all possible values of QP. If a particular quantization-parameter $\rho$ is zero, then $\rho$ is guaranteed to remain zero for all larger quantization-parameter values and hence need not be computed. In other words:

If $\rho(QP_i)=0$ then $\rho(QP)=0$ For all $QP>QP_i$.

The $\rho$-QP table obtained from a macroblock can be accumulated over an entire frame to get the $\rho$-QP table of the frame. A "macroblock" generally refers to a 16 pixel by 16 pixel video block. If one assumes that images of a video sequence are fairly stationary, then the ρ-QP table estimated from a previous frame can be used to predict the QP for the current frame. Moreover, the initial value of QP can be changed on a macroblock basis using a macroblock-level rate control.

The following steps may be used to implement a basic ρ-domain rate control algorithm.

Step 1: Estimate the bit budget $R_f$ of the current frame

Step 2: Estimate the corresponding $\rho_f$ using Equation 1 above. For the first frame, use the initial values for A and B Step 3: Using $\rho_f(QP)$, choose a $QP=QP_f$ that gives a ρ that is closest to $\rho_f$ Step 4(a): Perform macroblock-level rate control initialization: $\rho_a=0$; i=0, where N is the number of macroblocks per frame and i is the macroblock index.

Step 4(b): $\rho_m=(\rho_f-\rho_a)/(N-i)$. Using $\rho_m(QP)$, choose a $QP=QP_m$ that gives a ρ that is closest to $\rho_m$. $\rho_m(QP)$ can either be a scaled version of $\rho_f(QP)$ or be estimated from the previous macroblock. Clamp $QP_m$ so that its variation is within [−2+2] from the previous macroblock (for MPEG-4)

Step 4(c): For each of QP calculate $\rho_i(QP)$ using Equation 2 above.

Step 4(d): For each of QP replace ρ(QP) with ρ(QP)+$\rho_i$(QP)

Step 4(e): Replace $\rho_a$ with $\rho_a+\rho_i(QP_m)$; Replace i with i+1

Step 4(f): Loop to step 4(b) until (i<N)

Step 5: replace $\rho_f(QP)$ with ρ(QP). Using $\rho_a$, and the texture bits ($R_t$) and non-texture ($R_n$) bits spent in the current frame re-estimate A and B. B=$R_n$ and A=($R_t/\rho_a$).

Step 6: Loop to step (1) until all frames are over.

For MPEG-4 and ITU H.263 compliant encoders, calculation of the ρ-QP table can be done in a more straightforward manner than for encoders that comply with ITU H.264. The following pseudo code illustrates one such computation for a video block in compliance with the MPEG-4 or ITU H.263 standards.

```
For QP=1 to 31
{
    ρ(QP)=0;
    If (INTRA)
    {
        if (|(DCT(0) + (dc_scalar>>1))| >= dc_scalar)
            ρ(QP) ++;
        for i=1 to 63
            if (|DCT(i)| >= (QP<<1))
                ρ(QP) ++;
            end
    }
    else
    {
        for i= 0 to 63
            if (|(|DCT(i)| − (QP>>1))| >= (QP <<1))
                ρ(QP) ++;
            end
    }
    if (ρ(QP)) == 0)
        break;
}
```

Figure 4:
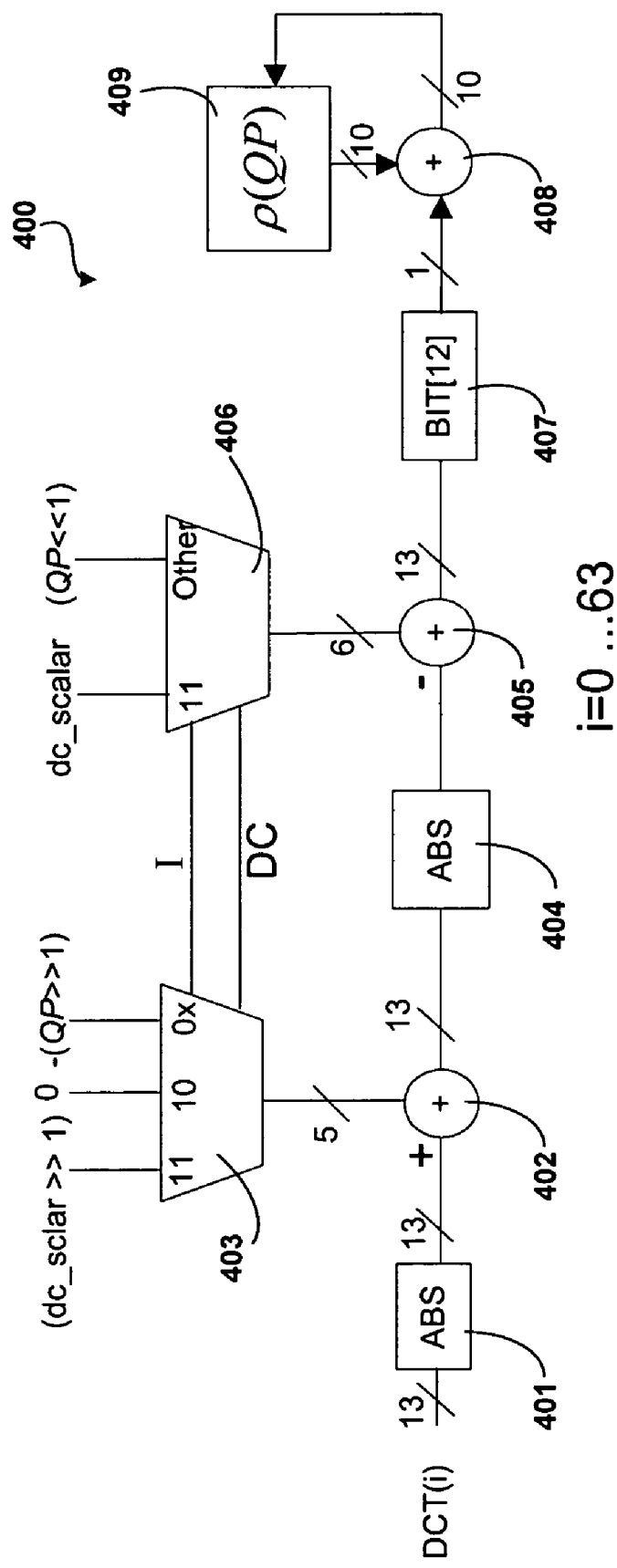
FIG. 4 is an exemplary circuit diagram showing a circuit that can directly compute a $\rho$(OP) lookup table (LUT) in compliance with the MPEG-4 standard or the ITU H.263 standard.

FIG. 4 illustrates exemplary hardware circuitry that could be used to calculate the ρ(QP) table for an encoder that complies with the MPEG-4 or ITU H.263 encoding standards. The accumulation shown in FIG. 4 would need to be repeated for all the luminosity (luma) and chromaticity (chorma) blocks, e.g., 4 luma and 2 chorma blocks.

As illustrated in FIG. 4 circuit 400 receives DCT(i) as input. DCT(i) represents the discrete cosign transform coefficient with index (i). Block 401 generates the absolute value of DCT(i), which is forwarded to adder 402. The absolute value of DCT(i) is then added to the output of multiplexer 403. Multiplexer 403 selects one of three values. The inputs to multiplexer 403 are the dc_scaler value right shifted by one, the value 0, and the negative of the quantization parameter QP right shifted by one. Multiplexer 403 selects dc_scaler value right shifted by one when both I and DC are ones, selects the value 0 when I is one and DC is zero, and selects the negative of the quantization parameter QP right shifted by one, when I is zero, regardless of the value of DC. The value of I is one when input block is an intra block, and zero when the input block is an inter block. The value of DC is one when the input parameter is DC and zero when the input parameter is AC. The DC coefficient represents the average value of a video block, whereas AC coefficients are the remaining coefficients of the video block.

The output of multiplexer 403 is added to the output of block 401 by adder 403. Block 404 then generates the absolute value of the output of adder 402 and provides the negative of this value as input to adder 405, which is added to the output of multiplexer 406. Multiplexer 406 receives the dc_scaler value and the quantization parameter QP left shifted by one. Multiplexer 406 selects the dc_scaler value as output when I and DC are both one, and otherwise selects the quantization parameter QP left shifted by one as output.

Adder 405 subtracts the output of block 404 from the output of multiplexer 406. Block 407 examines the 12$^{th}$ bit (the sign bit) of the output of adder 405, and provides this bit to adder 408. Block 409 accumulates the ρ(QP) table by adding the sign bit to each previous entry. Thus, adder 408 and ρ(QP) table block 409 can be viewed collectively as an accumulator that generates the ρ(QP) table. Circuit 400 may repeat these calculations for I=1 to 63 and QP=1 to 31.

In ITU H.264 compliant encoders, the quantization step is merged with a coefficient dependent scaling of the transform. This makes the calculation of ρ(QP) table more involved. The quantization can be implemented using the following equation.

$$F_{i,j}=(M W_{i,j}+A)>>S \quad \text{Equation 3}$$

Where $F_{i,j}$ is the quantized coefficient and $W_{i,j}$ is the unquantized transform coefficient. The multiplicative factor M, the additive factor A, and the shift factor S are dependent on the QP, coefficient indices i,j, intra prediction mode and also on whether the block is luma or chroma. From Equation 3, it can be observed that the quantized value $F_{i,j}$ will be non zero only if:

$$W_{i,j} >= (2^S - A)/M, \quad \text{Equation 4}$$
$$>= C$$

Where,

S=16+(QP/6) for DC of Intra_16×16 and chroma

S=15+(QP/6) for Other

A=$2^{S-1}$ For Intra

A=$2^{S-2}$ For Inter

The quantization can be designed so that for an increase of 6 in QP, the quantization step doubles. Hence, M has a set of 6 unique values, and M has the range of values as a function of (QP %6) and the indices i,j. The symbol % represents the MOD function, which provides the remainder. Thus, QP %6 is the same as QP MOD 6, which divides QP by 6 and yields the remainder of the division. The dependence of M on the indices is due to fact that the scaling required by the integer transform is absorbed in the quantization process. The following Table 1 shows the values of M. In particular, Table 1 lists multiplier values (also referred to as multiplicative factors), M, for various indices and QP %6.

TABLE 1

| QP % 6 | Indices (0, 0)(2, 0) (2, 2)(0, 2) | Indices (1, 1)(1, 3) (3, 1)(3, 3) | Other Indices |
|---|---|---|---|
| 0 | 13107 | 5243 | 8066 |
| 1 | 11916 | 4660 | 7490 |
| 2 | 10082 | 4194 | 6554 |
| 3 | 9362 | 3647 | 5825 |
| 4 | 8192 | 3355 | 5243 |
| 5 | 7282 | 2893 | 4559 |

From Equation 4, one can observe that if the un-quantized value $W_{i,j}$ is greater then or equal to C, the result will be a non-zero coefficient. Since the right hand side of Equation 4 is a fractional number, the integer value to which $W_{i,j}$ is compared is given by:

$$C = \left\lceil \frac{2^s - A}{M} \right\rceil.$$  Equation 5

The following Table 2 is a list of comparator values, C, for various indices and QP %6 for intra and inter macroblocks.

TABLE 2

| | Intra Macroblock: $A = 2^{S-1}$ | | | Inter Macroblock: $A = 2^{S-2}$ | | |
|---|---|---|---|---|---|---|
| QP % 6 S = 24 | Indices (0, 0)(2, 0) (2, 2)(0, 2) | Indices (1, 1)(1, 3) (3, 1)(3, 3) | Other Indices | Indices (0, 0)(2, 0) (2, 2)(0, 2) | Indices (1, 1)(1, 3) (3, 1)(3, 3) | Other Indices |
| 0 | 641 | 1600 | 1040 | 961 | 2400 | 1560 |
| 1 | 704 | 1801 | 1120 | 1056 | 2701 | 1680 |
| 2 | 833 | 2001 | 1280 | 1249 | 3001 | 1920 |
| 3 | 897 | 2301 | 1441 | 1345 | 3451 | 2161 |
| 4 | 1024 | 2501 | 1600 | 1536 | 3751 | 2400 |
| 5 | 1152 | 2900 | 1841 | 1728 | 4350 | 2761 |

Figures 5A, 5B:
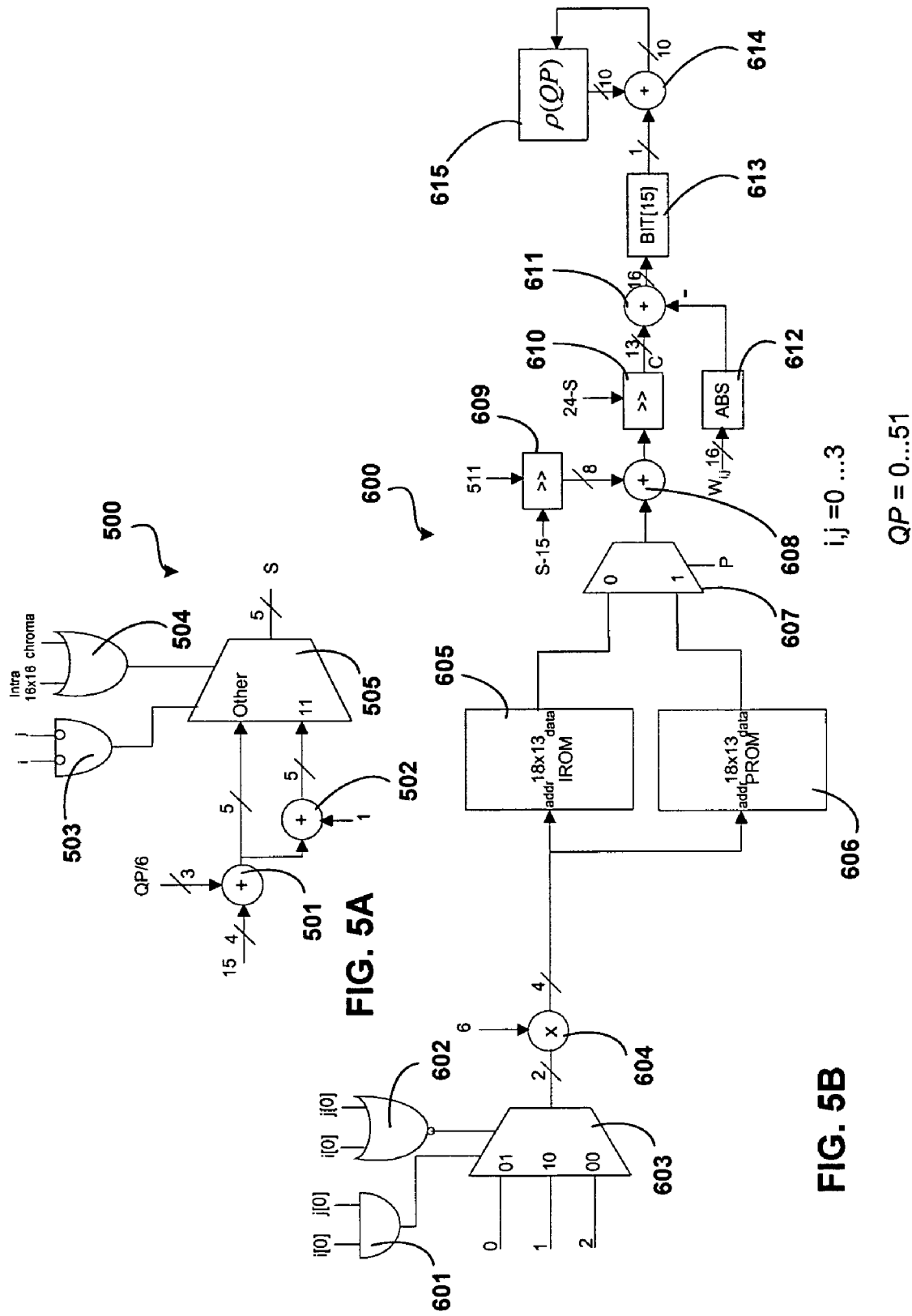
FIGS. 5A and 5B are exemplary circuit diagrams showing circuits that can be used to directly compute a $\rho$(OP) LUT in compliance with the ITU H.264 standard.

In particular, Table 2 gives value of the comparator C for the maximum shift value of S=24 for the various QP %6. These values can be stored in an 36×13 ROM column by column from left to right. FIGS. 5A and 5B are circuit diagrams illustrating exemplary circuitry that can be used to calculate the ρ(QP) table in compliance with the ITU H.264 standard.

As illustrated in FIG. 5A, the value 15 is added to the value QP/6 by adder 501. The output of adder 501 is provided to multiplexer 505 as well as the output of adder 501, which adds one to the output of adder 501. The output of multiplexer 505 is selected based on control signals from AND gate 503 and OR gate 504. The inputs i and j to AND gate 503 are the index values of the input coefficient, and are inverted. The inputs to OR gate 504 indicate whether the current block is an intra block and whether the current block is a chroma block. The output of adder 502 is selected by multiplexer when both inputs to multiplexer 505 are one, and the output of adder 501 is otherwise selected. The output S of circuit 500 is used by circuit 600 of FIG. 5B.

As shown in FIG. 5B, multiplexer 603 selects one of the values 0, 1 or 2 based on input signals from AND gate 601 and NOR gate 602. The inputs to gates 601 and 602 are the zero[th] bits of the index coefficients in the i and j dimensions respectively. If the output of gate 601 is zero and the output of gate 602 is one, the value 0 is selected by multiplexer 603. If the output of gate 601 is one and the output of gate 602 is zero, the value 1 is selected by multiplexer 603. If the output of gate 601 is zero and the output of gate 602 is zero, the value 2 is selected by multiplexer 603.

Multiplier 604 multiples the output of multiplexer 603 by six and inputs this value into memories 605 and 606. IROM 605 corresponds to intra blocks and PROM 606 corresponds to inter blocks. The input value P to multiplexer 607 is one when an inter block is being processed.

Multiplexer 607 selects from one of memories 605, 606 based on input P. The output of multiplexer 607 is provided to adder 608. The value S from circuit 5A is subtracted from 15. The value 511 is right shifted by the result of (15−S) by block 609, and the output of block 609 is provided to adder 608. Adder 608 sums the outputs of block 609 and multiplexer 607. The output of adder 608 is then right shifted by 24−S, which is represented by the variable C and represents a comparator value. The value C is provided to adder 611. The value $W_{i,j}$ represents the input coefficient. Block 612 generates the absolute value of the value $W_{i,j}$, which is the subtracted from the value C by adder 611.

Block 613 generates the sign bit (the 15th bit) of the output of adder 611. The sign bit is then provided to adder 614. Block 615 accumulates the ρ(QP) table by adding the sign bit to each previous entry. Thus, adder 614 and ρ(QP) table block 615 can be viewed collectively as an accumulator that generates the ρ(QP) table. Circuits 500 and 600 may repeat these calculations for i,j=1 to 3 and QP=1 to 51.

As more generally shown in FIGS. 5A and 5B, a rounding factor is added to the stored comparator value before it is shifted down. This factor can be chosen such that the fractional value resulting from the division is always ceiled. By doing so, it is guaranteed that for every value of S between 15 and 24 the resulting C is the ceiling of the faction in Equation 5. Also, much of the circuitry illustrated in FIGS. 5A and 5B may be already in place in hardware components that implement the forward quantization in compliance with the ITU H.264 standard, including an address generator and a component that calculates S. The accumulation shown in FIGS. 5A and 5B can be repeated for all the luma and chroma blocks (16 luma and 8 chroma blocks).

The direct computation of the ρ-QP table described above and illustrated in FIG. 4 and FIGS. 5A and 5B is computationally complex. In the worst case, the direct computation may involve one comparison and one addition per coefficient per QP. If QP can have M possible values and there are N coefficients, then the number of operations required for the direct computation of ρ-QP table is M*N. More simplified approaches are described in greater detail below, including various "threshold" approaches.

In a "threshold" approach, the ρ-QP table may involve the calculation of the QP threshold $\tau_i$ for every un-quantized coefficient $C_i$. The threshold, $\tau_i$, may be a quantization parameter such that, For all QP>$\tau_i$, Q($C_i$, QP)=0 and For all QP≤$\tau_i$, Q($C_i$, QP)≠0   Equation 6

The function Q($C_i$, QP) represents the quantization operation of the coefficient $C_i$ using the quantization parameter QP. The threshold-QP table T(QP) can be calculated using the following pseudo-code:

for QP=1 to 31
  T(QP)=0
End
for I=1 to N
  T($\tau_i$)++;
End

Then, a ρ-QP table can be easily calculated from T(QP) using the following pseudo-code:

for QP=$QP_{MAX}$−1 to $QP_{MIN}$
  T(QP)=T(QP+1)+T(QP)
End
ρ(QP)=T(QP)

Using the threshold approach (also referred to as a threshold method), the total number of operations needed to calculate the ρ-QP table can be reduced to 2N+M, compared to N*M computations required for the direct computation. This generally assumes that it takes N operations to lookup a table to calculate the threshold for each of the coefficients and another N operations to accumulate the threshold values of the N coefficients, followed by M operations to accumulate the T(OP) table in order to obtain the ρ-QP table.

If calculation of the ρ-QP table is performed for every macroblock, then the threshold method reduces the computation by more than 90%. Moreover, the reduction in computations will be even more if the table is only computed once per frame. The threshold method of calculating the ρ-QP table is also very advantageous for hardware implementations because it avoids the need to have M accumulators running in parallel. If implemented in hardware, the hardware can calculate the T(QP) table for each macroblock and pass it on to a DSP. The DSP will use this threshold table to calculate the ρ-QP table.

For MPEG-4 and H.263 the calculation of $\tau_i$ can be performed as follows:

$$\tau_i = |C_i| \gg 1,$$

for Intra AC and DC coefficients $$\tau_i = \frac{|2C_i|}{5}$$
$$= (|C_i| \times 0x666 + 0x4CD) \gg 12,$$

for Inter AC and DC coefficients

Figure 6:
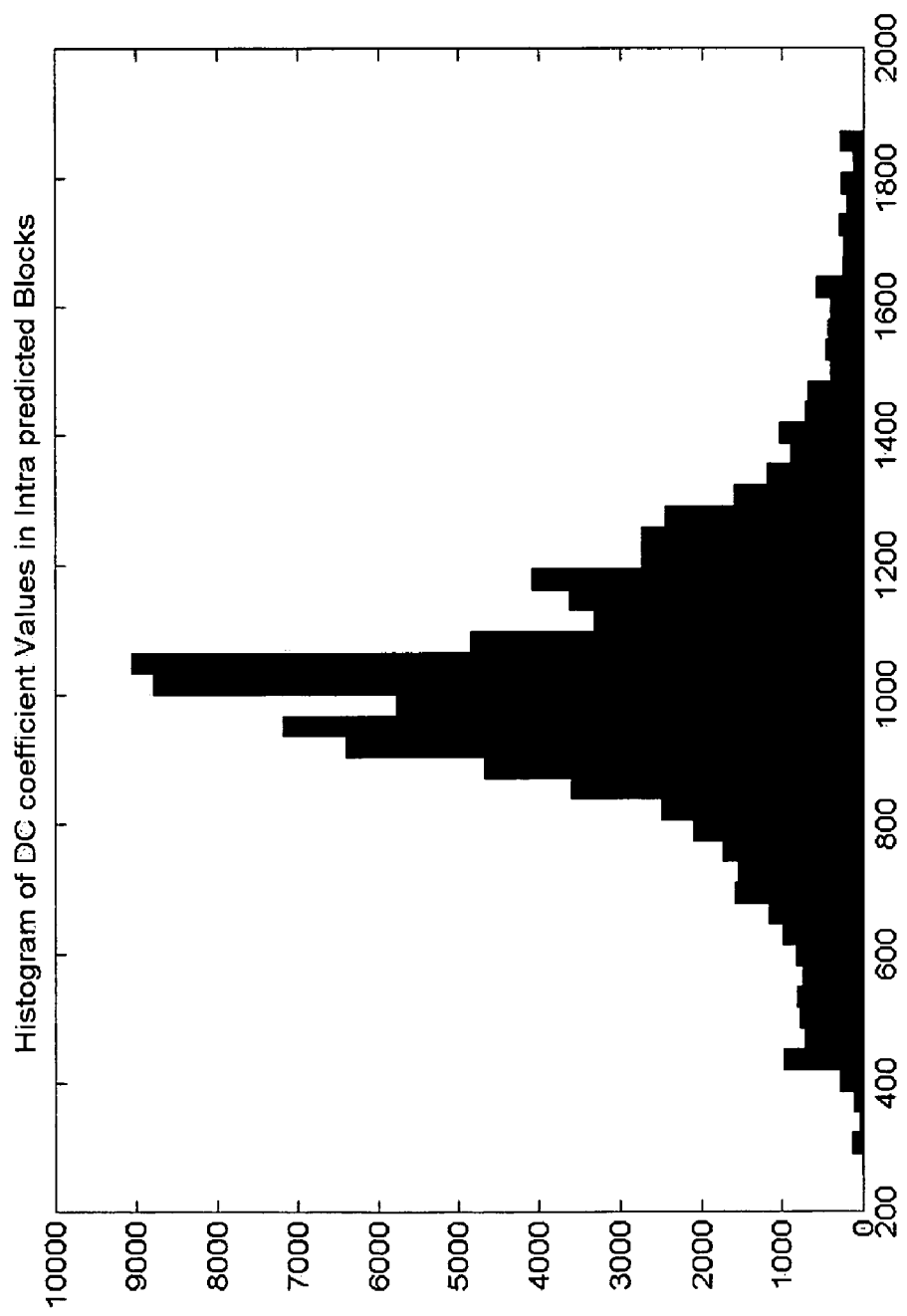
FIG. 6 is a histogram of intra DC coefficients illustrating that it is not necessary to use a separate equation (or table look-up) for the intra ac coefficients as the chances of these coefficients becoming zero after quantization are remote.

For the intra case, |$C_i$| is limited to [0 62] and for the inter case, |$C_i$| is limited to [0 77]. 0x666 is (2/5) and 0x4CD is (3/10) in Q12. From these equations it can be observed that for MPEG-4 and H.263 the computation that is necessary for estimating $\tau_i$ is nominal. It is not necessary to use a separate equation (or table look-up) for the intra ac coefficients as the chances of these coefficients becoming zero after quantization are remote. This can be observed from the histogram of the intra DC coefficients shown in FIG. 6.

Table 3, below is one exemplary look up table (LUT) for finding the threshold values for MPEG4 inter coefficients.

TABLE 3

| Address | Value |
|---|---|
| 0 | 0 |
| 1 | 0 |
| 2 | 1 |
| 3 | 1 |
| 4 | 1 |
| 5 | 2 |
| 6 | 2 |
| 7 | 3 |
| 8 | 3 |
| 9 | 3 |
| 10 | 4 |
| 11 | 4 |
| 12 | 5 |
| 13 | 5 |
| 14 | 5 |
| 15 | 6 |
| 16 | 6 |
| 17 | 7 |
| 18 | 7 |
| 19 | 7 |
| 20 | 8 |
| 21 | 8 |
| 22 | 9 |
| 23 | 9 |
| 24 | 9 |
| 25 | 10 |
| 26 | 10 |
| 27 | 11 |
| 28 | 11 |
| 29 | 11 |
| 30 | 12 |
| 31 | 12 |
| 32 | 13 |
| 33 | 13 |
| 34 | 13 |
| 35 | 14 |
| 36 | 14 |
| 37 | 15 |
| 38 | 15 |
| 39 | 15 |
| 40 | 16 |
| 41 | 16 |
| 42 | 17 |
| 43 | 17 |
| 44 | 17 |
| 45 | 18 |
| 46 | 18 |
| 47 | 19 |
| 48 | 19 |
| 49 | 19 |
| 50 | 20 |
| 51 | 20 |
| 52 | 21 |
| 53 | 21 |
| 54 | 21 |
| 55 | 22 |
| 56 | 22 |
| 57 | 23 |
| 58 | 23 |
| 59 | 23 |
| 60 | 24 |
| 61 | 24 |
| 62 | 25 |

TABLE 3-continued

| Address | Value |
|---|---|
| 63 | 25 |
| 64 | 25 |
| 65 | 26 |
| 66 | 26 |
| 67 | 27 |
| 68 | 27 |
| 69 | 27 |
| 70 | 28 |
| 71 | 28 |
| 72 | 29 |
| 73 | 29 |
| 74 | 29 |
| 75 | 30 |
| 76 | 30 |
| 77 | 31 |
| — | — |
| — | — |
| — | — |

Table 4, is one exemplary look up table (LUT) for finding the threshold values for MPEG4 intra coefficients.

TABLE 4

| Address | Value |
|---|---|
| 0 | 0 |
| 1 | 0 |
| 2 | 1 |
| 3 | 1 |
| 4 | 2 |
| 5 | 2 |
| 6 | 3 |
| 7 | 3 |
| 8 | 4 |
| 9 | 4 |
| 10 | 5 |
| 11 | 5 |
| 12 | 6 |
| 13 | 6 |
| 14 | 7 |
| 15 | 7 |
| 16 | 8 |
| 17 | 8 |
| 18 | 9 |
| 19 | 9 |
| 20 | 10 |
| 21 | 10 |
| 22 | 11 |
| 23 | 11 |
| 24 | 12 |
| 25 | 12 |
| 26 | 13 |
| 27 | 13 |
| 28 | 14 |
| 29 | 14 |
| 30 | 15 |
| 31 | 15 |
| 32 | 16 |
| 33 | 16 |
| 34 | 17 |
| 35 | 17 |
| 36 | 18 |
| 37 | 18 |
| 38 | 19 |
| 39 | 19 |
| 40 | 20 |
| 41 | 20 |
| 42 | 21 |
| 43 | 21 |
| 44 | 22 |
| 45 | 2 |
| 46 | 23 |

TABLE 4-continued

| Address | Value |
|---|---|
| 47 | 23 |
| 48 | 24 |
| 49 | 24 |
| 50 | 25 |
| 51 | 25 |
| 52 | 26 |
| 53 | 26 |
| 54 | 27 |
| 55 | 27 |
| 56 | 28 |
| 57 | 28 |
| 58 | 29 |
| 59 | 29 |
| 60 | 30 |
| 61 | 30 |
| 62 | 31 |
| — | — |
| — | — |
| — | — |
| — | — |
| — | — |
| — | — |
| — | — |
| — | — |
| — | — |
| — | — |
| — | — |
| — | — |

In particular, if it is necessary to implement the threshold calculation of MPEG-4 using a table due to hardware considerations, then the exemplary entries for inter and intra coefficients are given in Tables 3 and 4 respectively.

For the ITU H.264 standard, a direct computation of the threshold from the un-quantized coefficients is more difficult because in the ITU H.264 standard, the divisor is not just dependent on QP but is also dependent on other factors. One general hardware structure that can be used to calculate the thresholds for compliance with the ITU H.264 standard is shown in FIG. 7.

Figure 7:
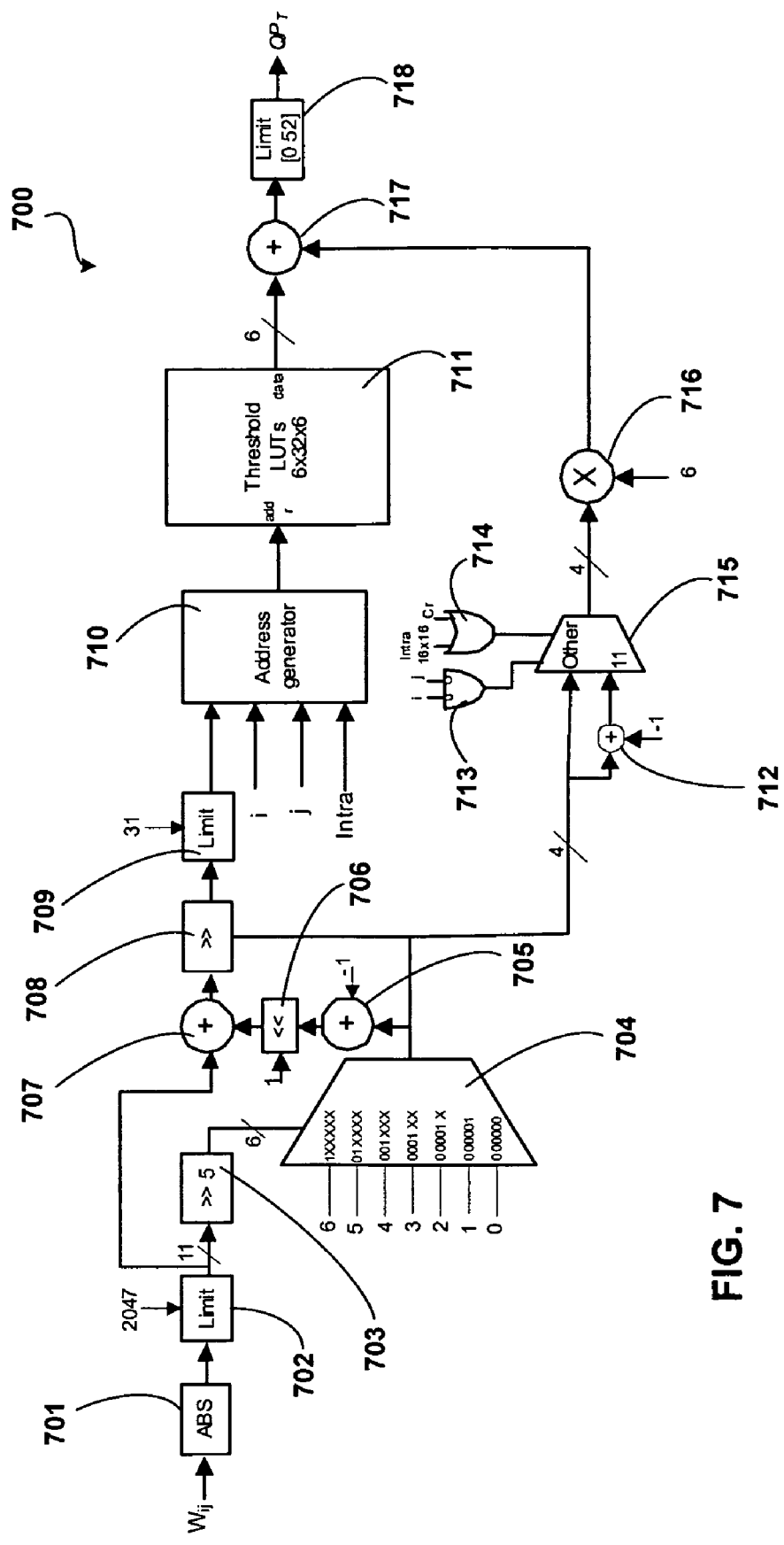
FIG. 7 is an exemplary circuit diagram of an exemplary circuit that may be used to calculate thresholds to be used in the creation of a threshold-OP LUT, in compliance with the ITU H.264 standard.

As shown in FIG. 7, the input coefficient $W_{i,j}$ is input to block 701, which generates the absolute value of $W_{i,j}$. Block 702 limits the absolute value of $W_{i,j}$ to 2047, and forward its output to adder 707. The output of block 702 is also right shifted by five, by block 703. The output of block 703 is the input signal to multiplexer 704. The most significant bit of the input to multiplexer 704 is used to select the output from the values 0, 1, 2, 3, 4, 5 and 6.

Adder 705 subtracts one from the output of multiplexer 704. The output of adder 705 is then left shifted by one. The output of block 706 is provided to adder 707 and added to the output of block 702. The output of adder 707 is then right sifted by the value output by multiplexer 704. Block 709 limits the value of block 708 to 31. The output of block 709 is then provided to address generator 710.

Address generator 710 generates an address used by LUTs 711. In particular address generator receives the output of block 709 as well as i, j and intra to generate the address that is fed to LUTs 711. Examples of LUTs 711 are provided in Tables 6 and 7, below. Table 6 represents a LUT for intra values and Table 7 represents an example LUT for inter values. The respective input values to address generator 710 can be mapped to the specific value of one of the LUTs. Given an address (addr), appropriate data is selected from LUTs 711.

The output of a respective one of LUTs 711 is provided to adder 717. The output of multiplexer 704 is also provided to multiplexer 715. Adder 712 subtracts one from the output of multiplexer 704 and provides this value as the other input to multiplexer 715. The output of multiplexer 715 is selected based on control signals from AND gate 713 and OR gate 714. The inputs i and j to AND gate 713 are the index values of the input coefficient, and are inverted. The inputs to OR gate 714 indicate whether the current block is an intra block and whether the current block is a chroma block. The output of adder 712 is selected by multiplexer when both inputs to multiplexer 715 are one, and the output of multiplexer 704 is otherwise selected by multiplexer 715.

The output of multiplexer 715 is then multiplied by six by multiplier 716. The output of multiplier 716 is added by the selected output of one of LUTs 711 by adder 717. The output of adder 717 is limited with a lower limit of 0 and an upper limit of 52 by block 718. The output of circuit 700 is the quantization parameter threshold $QP_T$. The value $QP_T$ may be used as input to circuit 900 of FIG. 9, discussed below.

In the hardware circuit diagram of FIG. 7, a limiting factor L is used to limit the absolute value of the un-quantized coefficients to below the largest divisor used for quantization. For all $W_{i,j}$ larger than L it is generally guaranteed that $\tau_{i,j}$ ($QP_T$) will be equal to $QP_{max}$. Hence, there is no need to store entries in LUT corresponding to $W_{i,j}$s larger than L. The value of L depends on the coefficient index and the mode of the macroblock (intra or inter). The various values of L are shown in Table 5, below. In particular, Table 5 lists absolute values above which the QP threshold will be clamped to $QP_{max}$.

TABLE 5

|  | Indices (0, 0)(2, 0) (2, 2)(0, 2) | Indices (1, 1)(1, 3) (3, 1)(3, 3) | Other Indices |
|---|---|---|---|
| Intra | 450 | 1152 | 722 |
| Inter | 674 | 1727 | 1082 |

Figure 8A:
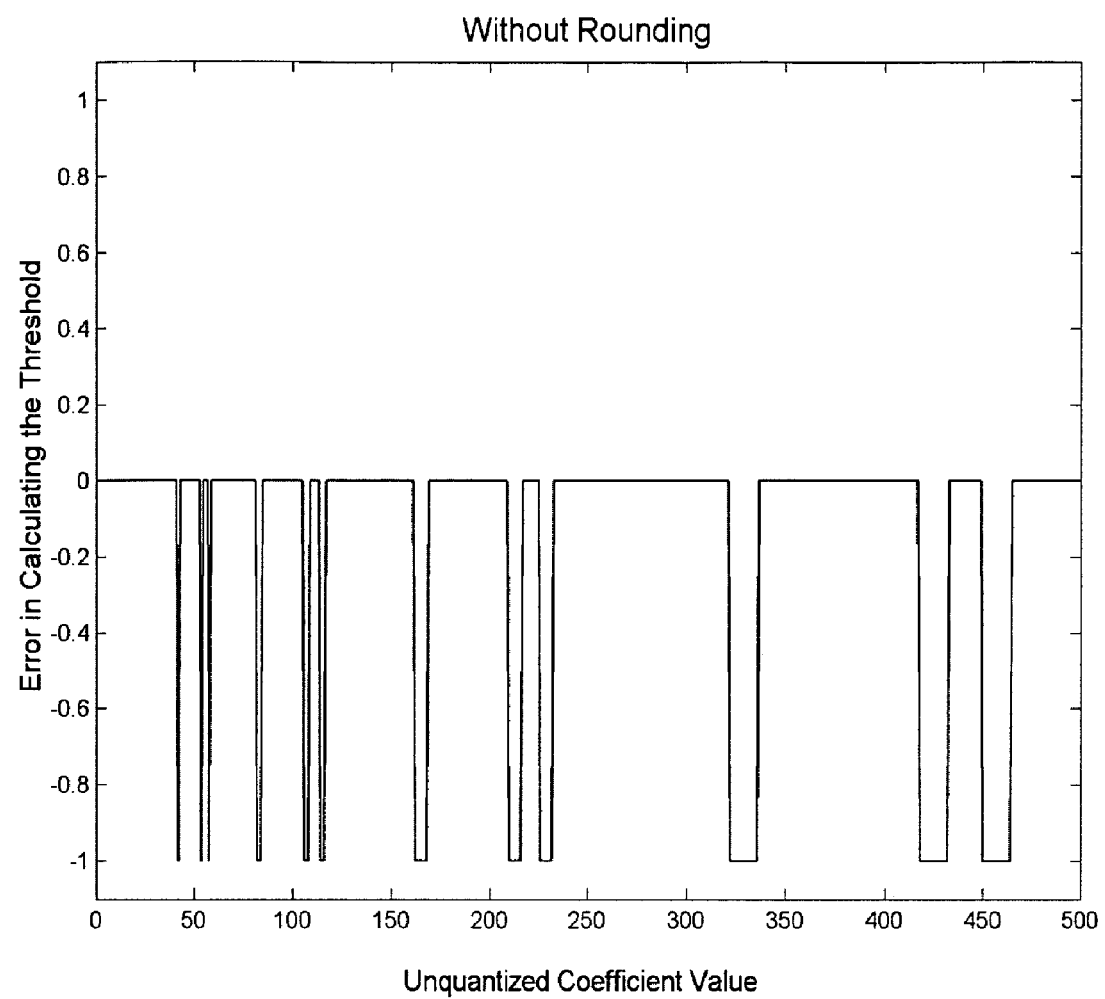
FIGS. 8A and 8B are graphs illustrating the effect of rounding the bias used for address calculation of the threshold LUT.
Figure 8B:
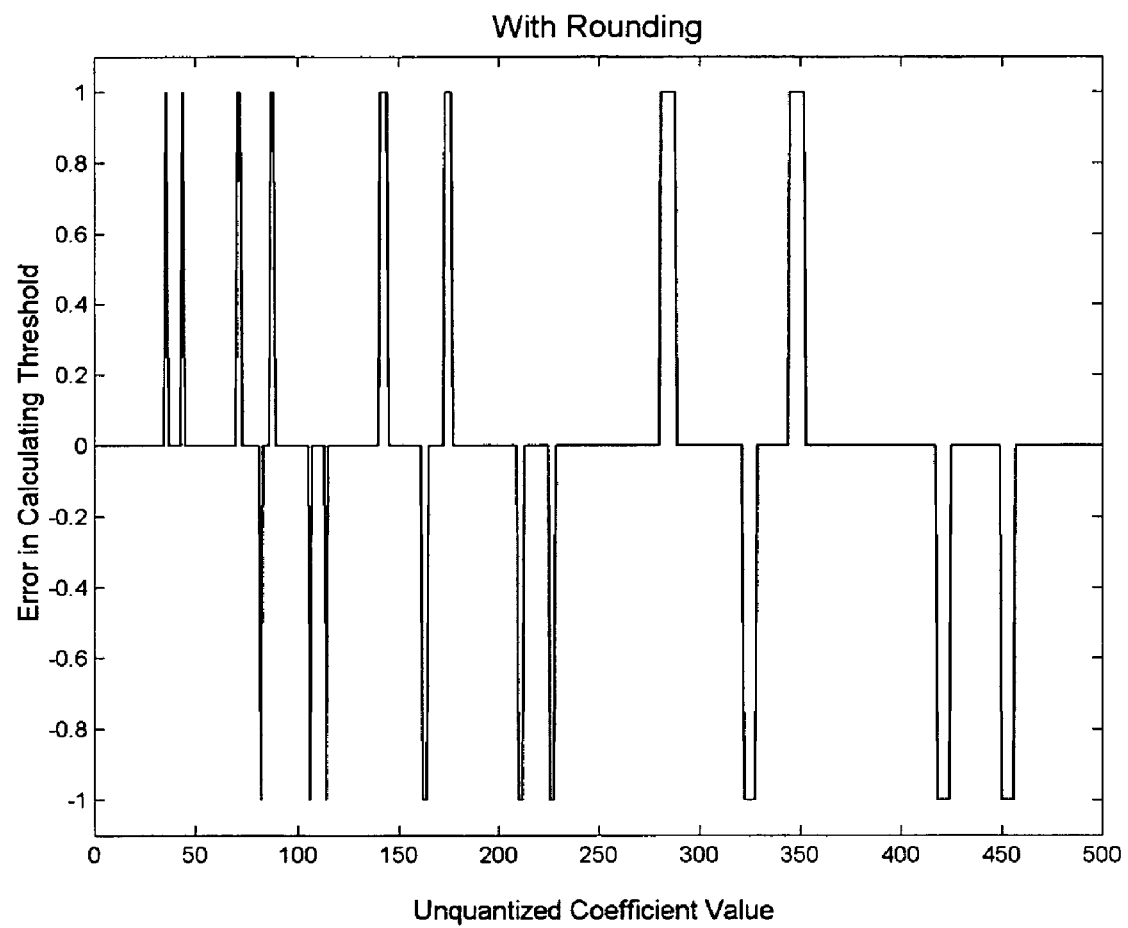

In some embodiments, the largest limiting value that is a power of 2 (2047) be used as a common clipping factor. The LUT can be stored for only 32 input values [0 to 31]. In ITU H264, the quantization step-size (divisor) doubles for every increment of six in QP. Hence, in order to map the input value, the smallest divisor (that is power or two), $D=2^S$ that will convert the clipped input into a number between 0 and 31 can be computed. This is done by dividing the input by 32 and counting the number of bits used to represent the output (implemented with a shift register and a multiplexer). The clipped value is then shifted down by S. The error in the lookup can be made less biased if this division is done with rounding. FIGS. 8A and 8B are graphs illustrating the effect of rounding the bias used for address calculation of the threshold LUT.

The shift factor S is multiplied by 6 and then added to the result of the lookup to get the final threshold QP. The LUT is dependent on whether the macroblock is an intra block or inter block, and also on the indices of the coefficients. Exemplary entries for intra and inter coefficients are given in Tables 6 and 7 respectively. In particular, Table 6 is an exemplary look up table for finding the threshold values for ITU H.264 intra coefficients, whereas Table 7 is an exemplary look up table for finding the threshold values for ITU H.264 inter coefficients.

TABLE 6

| Address | Indices (0, 0)(2, 0) (2, 2)(0, 2) | Indices (1, 1)(1, 3) (3, 1)(3, 3) | Other Indices |
|---|---|---|---|
| 0 | 0 | 0 | 0 |
| 1 | 0 | 0 | 0 |
| 2 | 5 | 0 | 0 |
| 3 | 8 | 0 | 4 |
| 4 | 11 | 3 | 6 |
| 5 | 12 | 5 | 9 |
| 6 | 14 | 6 | 10 |
| 7 | 15 | 7 | 11 |
| 8 | 17 | 9 | 12 |
| 9 | 18 | 10 | 14 |
| 10 | 18 | 11 | 15 |
| 11 | 20 | 11 | 15 |
| 12 | 20 | 12 | 16 |
| 13 | 20 | 13 | 17 |
| 14 | 21 | 13 | 17 |
| 15 | 22 | 14 | 18 |
| 16 | 23 | 15 | 18 |
| 17 | 23 | 15 | 19 |
| 18 | 24 | 16 | 20 |
| 19 | 24 | 16 | 20 |
| 20 | 24 | 17 | 21 |
| 21 | 25 | 17 | 21 |
| 22 | 26 | 17 | 21 |
| 23 | 26 | 18 | 22 |
| 24 | 26 | 18 | 22 |
| 25 | 26 | 19 | 23 |
| 26 | 26 | 19 | 23 |
| 27 | 27 | 19 | 23 |
| 28 | 27 | 19 | 23 |
| 29 | 28 | 20 | 24 |
| 30 | 28 | 20 | 24 |
| 31 | 28 | 20 | 24 |

TABLE 7

| Address | Indices (0, 0)(2, 0) (2, 2)(0, 2) | Indices (1, 1)(1, 3) (3, 1)(3, 3) | Other Indices |
|---|---|---|---|
| 0 | 0 | 0 | 0 |
| 1 | 0 | 0 | 0 |
| 2 | 1 | 0 | 0 |
| 3 | 5 | 0 | 0 |
| 4 | 7 | 0 | 3 |
| 5 | 9 | 1 | 5 |
| 6 | 11 | 3 | 6 |
| 7 | 12 | 4 | 8 |
| 8 | 13 | 5 | 9 |
| 9 | 14 | 6 | 10 |
| 10 | 15 | 7 | 11 |
| 11 | 16 | 8 | 12 |
| 12 | 17 | 9 | 12 |
| 13 | 17 | 9 | 13 |
| 14 | 18 | 10 | 14 |
| 15 | 18 | 11 | 15 |
| 16 | 19 | 11 | 15 |
| 17 | 20 | 12 | 16 |
| 18 | 20 | 12 | 16 |
| 19 | 20 | 13 | 17 |
| 20 | 21 | 13 | 17 |
| 21 | 21 | 13 | 17 |
| 22 | 22 | 14 | 18 |
| 23 | 22 | 14 | 18 |
| 24 | 23 | 15 | 18 |
| 25 | 23 | 15 | 19 |
| 26 | 23 | 15 | 19 |
| 27 | 24 | 16 | 20 |
| 28 | 24 | 16 | 20 |
| 29 | 24 | 16 | 20 |
| 30 | 24 | 17 | 21 |
| 31 | 25 | 17 | 21 |

In order to further simplify the creation of the Threshold-QP Table, hardware can be designed to accumulate the threshold QPs over all coefficients in order to form the T(QP) table. Exemplary circuitry that can be used to accumulate threshold QPs to form the T(QP) table is shown in FIG. 9.

Figure 9:
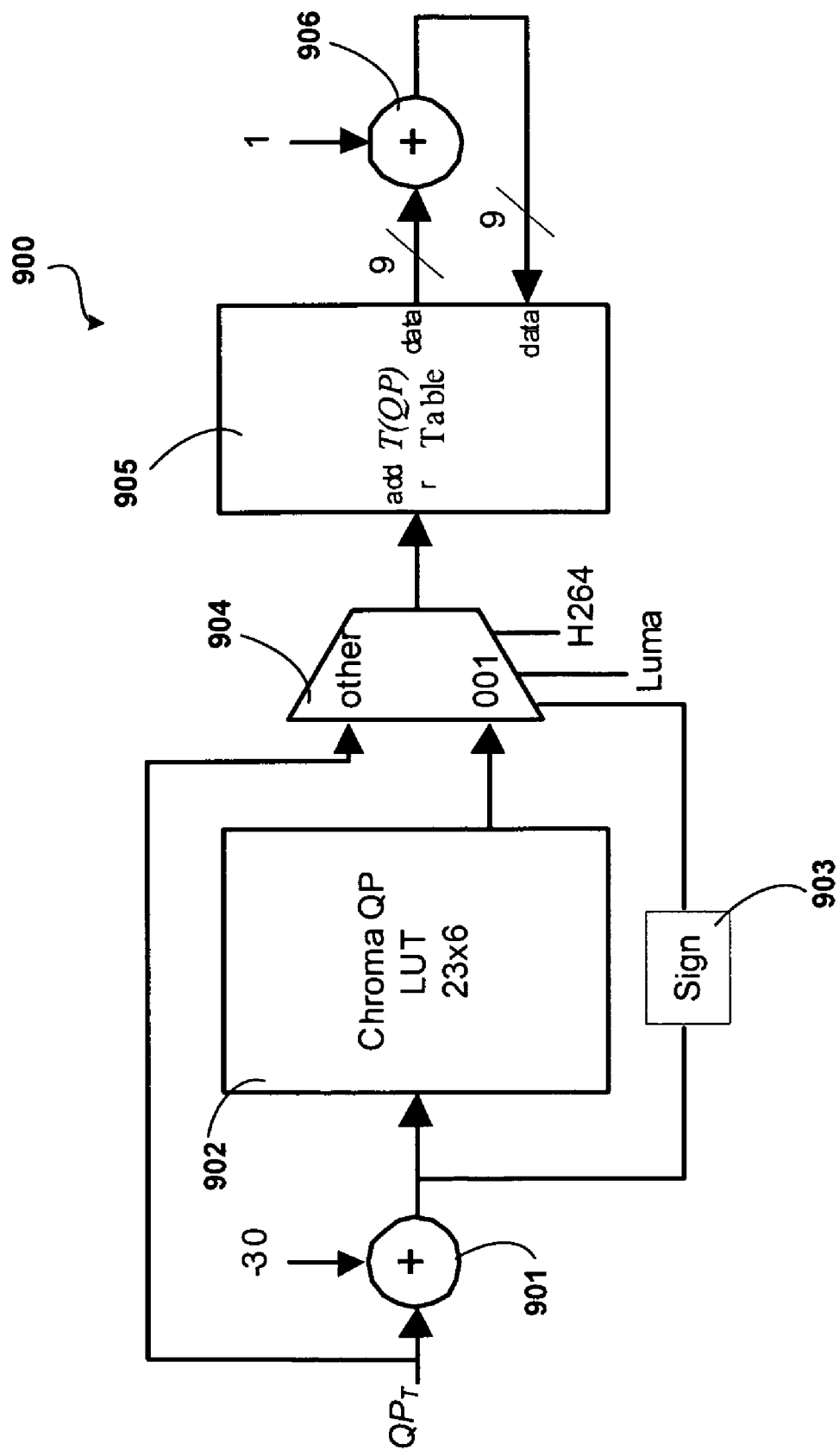
FIG. 9 is an exemplary circuit diagram of a circuit that can be used to accumulate threshold QPs to form a threshold-QP table.

As shown in FIG. 9, circuit 900 receives the quantization parameter threshold $QP_T$ input. Adder 901 subtracts 30 from $QP_T$ and provides this value to Chroma QP LUT 902, an example of which is provided in Table 8. Multiplexer 904 selects between the value of $QP_T$ and the value stored in the Chroma QP LUT 902 based on input signals that correspond to the sign of the output of adder 901, as determined by block 903 and the Luma and H264 input signals. The value stored in the Chroma QP LUT 902 is selected if the sign value is zero, the luma value is zero indicating that the block is not a luma block, and the H264 value is one indicating that the encoding standard is ITU H.264. Otherwise, multiplexer 904 selects QPT as output. The output of multiplexer 904 comprises an input address (addr) stored in T(QP) table 905. The original address value output from multiplexer 904, however, is output to adder 906, added to one and stored over the original address value in T(QP) table 905. A specific $QP_T$ is generated for each coefficient, and each of these $QP_T$ The LUT used to convert the chroma QP value to the QP value in compliance with the ITU H.264 standard is given in Table 8. In particular, Table 8 illustrates a table to map chroma-QP thresholds to QP thresholds.

TABLE 8

| | Address | | | | | | | | | | |
|---|---|---|---|---|---|---|---|---|---|---|---|
| | 0 | 1 | 2 | 3 | 4 | 5 | 6 | 7 | 8 | 9 | 10-22 |
| Value | 31 | 32 | 33 | 35 | 36 | 38 | 40 | 42 | 45 | 48 | 52 |

Table 9 lists experimental results of the bit rate variation of different video clips. Table 9 lists the results using a conventional baseline approach, and the results using a ρ-domain approach as outlined herein, for purposes of comparison. Table 9 lists five different video clips that were used in the experiment. The different clips were encoded at four different rate controlled manners: 64 kilobits per second (Kbps) and quarter common interface format (QCIF)—15 frames per second (FPS); 28 Kbps and QCIF—15FPS; 55 Kbps and QCIF—10 FPS; and 35 Kbps and QCIF—10 FPS. The baseline approach generally refers to a fixed quadratic approach, mentioned previously.

TABLE 9

| | 64 Kbps QCIF-15 FPS | | 28 Kbps QCIF-15 FPS | | 55 kbps QCIF-10 FPS | | 35 kbps QCIF-10 FPS | |
|---|---|---|---|---|---|---|---|---|
| Clip | Old | ρ-method | Old | ρ-method | Old | ρ-method | Old | ρ-method |
| Stefan | 64.05 | 63.98 | 30.37 | 29.71 | 55.03 | 55.00 | 35.03 | 34.99 |
| Table | 63.95 | 63.97 | 28.00 | 27.99 | 54.95 | 54.97 | 34.97 | 34.98 |
| Foreman | 63.87 | 64.01 | 28.01 | 27.99 | 54.83 | 55.00 | 35.00 | 35.00 |
| Mother_dau | 63.71 | 63.98 | 27.92 | 27.99 | 54.18 | 55.02 | 34.72 | 34.99 |
| Costguard | 63.92 | 64.01 | 27.97 | 28.00 | 54.92 | 55.00 | 34.97 | 35.01 |
| Standard Deviation | 0.13 | 0.02 | 1.07 | 0.77 | 0.34 | 0.02 | 0.12 | 0.01 |

From Table 9 it can be observed that both a conventional baseline approach, and the proposed ρ-domain approach are adequate in achieving a target bit-rate. The ρ-domain approach reduces the variance of bit-rate across various clips.

Table 10 lists experimental results quantifying the standard deviation of bits used per frame for various video clips encoded at different target bit rates. Table 10 lists the results using a conventional baseline approach, and the results using a ρ-domain approach as outlined herein. Table 10 includes data for five different video clips, which were encoded at different target bit rates. The different clips were encoded at four different rate controlled manners: 28 kilobits per second (Kbps) and quarter common interface format (QCIF)—15 frames per second (FPS); 35 Kbps and QCIF—10 FPS; 55 Kbps and QCIF—10 FPS; and 64 Kbps and QCIF—15FPS.

TABLE 10

| | 28 Kbps QCIF-64 FPS (bits) | | 35 Kbps QCIF-10 FPS (bits) | | 55 Kbps QCIF-10 FPS (bits) | | 64 Kbps QCIF-15 FPS (bits) | |
|---|---|---|---|---|---|---|---|---|
| Clip | Old | ρ-method | Old | ρ-method | Old | ρ-method | Old | ρ-method |
| Stefan | 553 | 442 | 1010 | 545 | 1889 | 861 | 1029 | 619 |
| Table | 746 | 558 | 1333 | 839 | 2163 | 926 | 1549 | 889 |
| Foreman | 621 | 302 | 1020 | 504 | 1323 | 792 | 1155 | 632 |
| Mother_dau | 772 | 304 | 2060 | 318 | 2664 | 864 | 2515 | 375 |

TABLE 10-continued

| | 28 Kbps QCIF-64 FPS (bits) | | 35 Kbps QCIF-10 FPS (bits) | | 55 Kbps QCIF-10 FPS (bits) | | 64 Kbps QCIF-15 FPS (bits) | |
|---|---|---|---|---|---|---|---|---|
| Clip | Old | ρ-method | Old | ρ-method | Old | ρ-method | Old | ρ-method |
| Costguard | 646 | 293 | 956 | 420 | 1359 | 522 | 1150 | 476 |
| Mean | 667 | 357 | 1275 | 525 | 1880 | 796 | 1480 | 598 |
| Reduction in variance | — | 46% | — | 59% | — | 58% | — | 60% |

As can be appreciated from Table 10 the ρ-domain technique significantly outperforms a conventional baseline system. On an average, the ρ-domain technique reduces the standard deviation by more than 50%. For some clips (mother_daughter) this reduction was a dramatic 85%.

Figure 10:
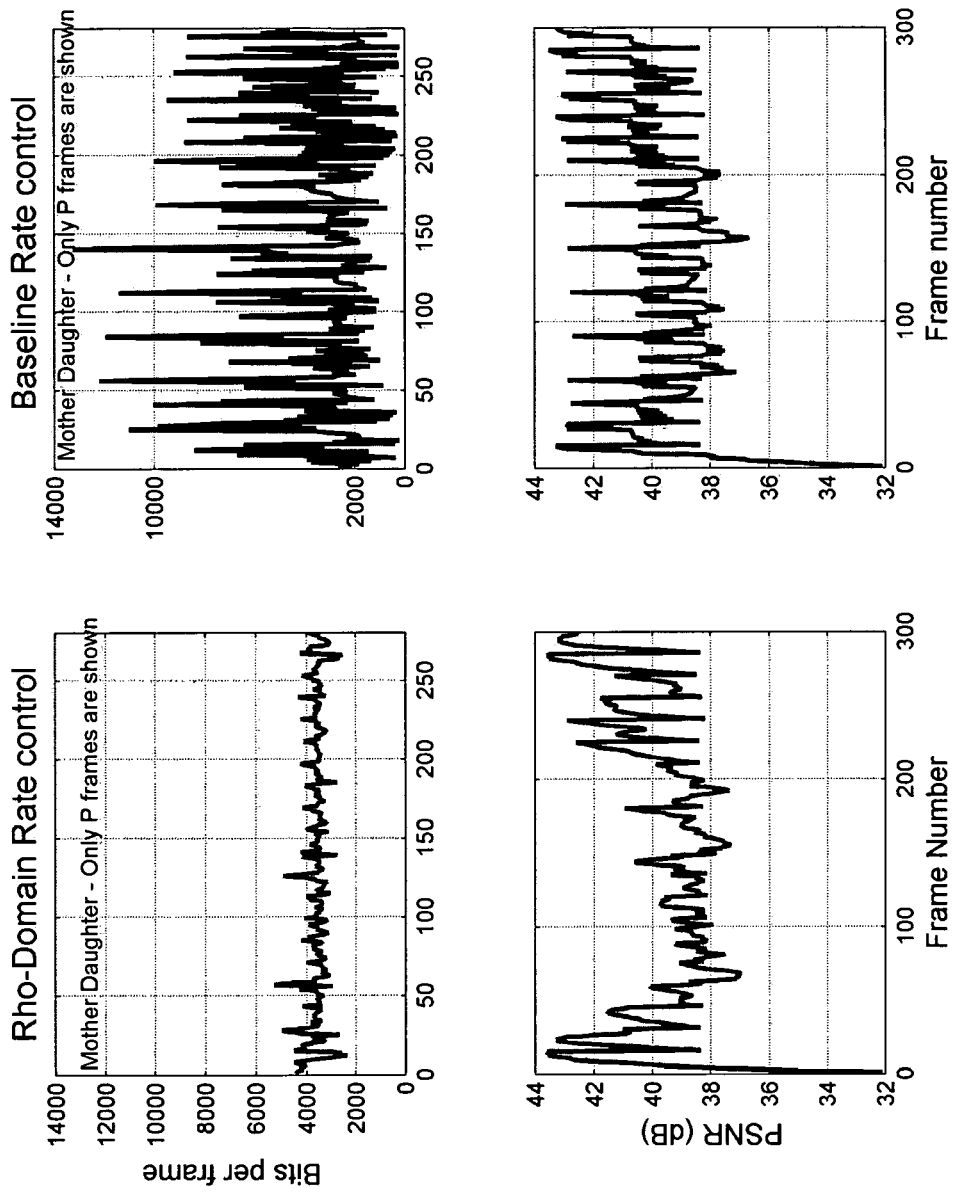
FIG. 10 includes four different plots showing the bits used per frame and peak signal to noise ratio (PSNR) per frame resulting from a conventional baseline approach and the $\rho$-domain rate control approach described herein.

FIG. 10 includes four different plots showing the bits used per frame and peak signal to noise ratio (PSNR) per frame resulting from a conventional baseline approach and the ρ-domain rate control approaches described herein. The plots of FIG. 10 correspond to the encoding of the mother-daughter clip at 64 Kbps.

From the plots of FIG. 10 it can be appreciated that while the reduction of variance of bits spent on frames is dramatic, the ρ-domain rate control does not negatively impact PSNR. In this example, the ρ-domain rate control even brings a smoother behavior to the PSNR trajectory across time, which is a desirable result.

Figure 11:
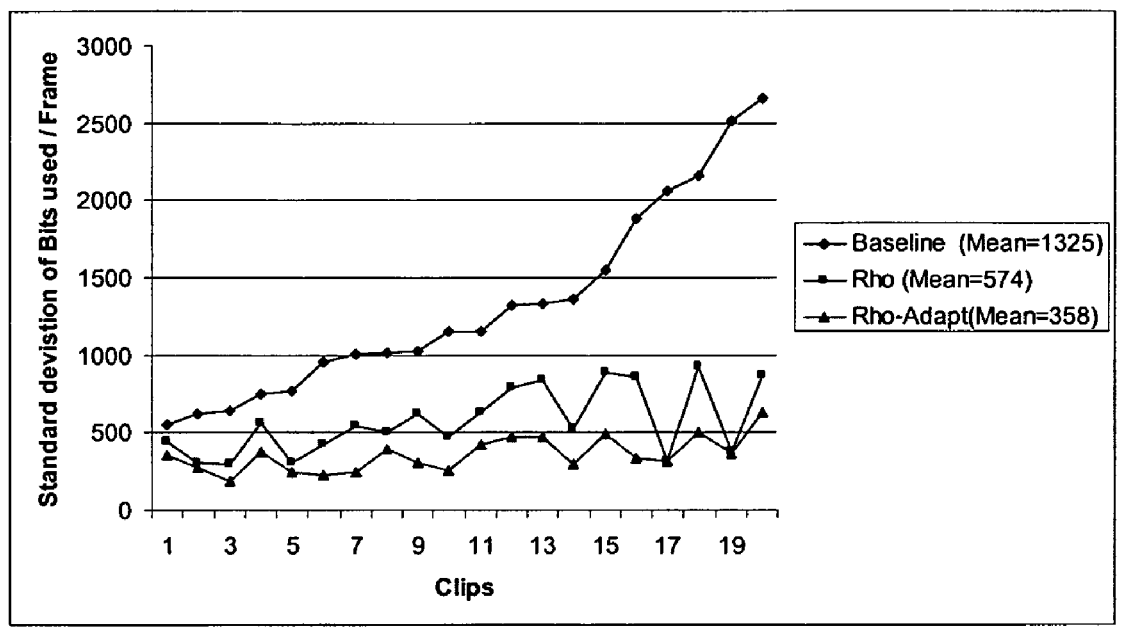
FIG. 11 is a graph of the standard deviations of bits used for different video clips using a baseline method, a $\rho$-domain method as described herein, and an adapted $\rho$-domain method as described herein.

Even further improvements to the performance of the encoding can be achieved by adapting the parameters A and B in Equation 1, listed above. In particular, adapting parameters A and B of Equation 1 can further improve the rate control by reducing the frame level bit fluctuation as shown in FIG. 11. Adaptation further reduces the variance by an average of another 37%. In this example, the parameters are updated once every frame in the Rho-Adapted technique. Adaptation of the parameters A and B in conjunction with the threshold approach described herein is referred to an adapted threshold approach.

It can also be important to reduce the variation of QP within a frame, as reductions in the variance of QP within a frame can help reduce the bits needed to encode the delta-QP, and reductions in the variance of OP can improve the encoding quality by making the quality relatively steady across a frame. This goal of reducing the variation of QP within a frame can be achieved by using a scaled ρ-QP table from the previous frame to perform macroblock-level rate control. This helps in reducing the variance of ρ-QP table estimate, thus reducing the fluctuation of QP values within a frame. Only approximately 25% of the macroblocks have unchanged QP values if the ρ-QP table from the previous macroblock is used for rate control. It can be observed that by using the scaled ρ-QP table from the previous frame, for almost 80% of the macroblocks there is no change in the value of QP.

The significant reduction in frame-level bit-rate variance caused by the ρ-domain rate control does not result in degradation in the quality of encoded video sequences as shown in Table 11. Table 11 provides comparisons of PSNR obtained from various encoded sequences.

TABLE 11

| Clip (15 Fps) | Baseline rate control (PSNR in dB) | ρ-Domain rate control (PSNR in dB) |
|---|---|---|
| Carphone 128 Kbps | 37.19 | 37.09 |
| Carphone 40 Kbps | 32.16 | 32.11 |
| Dancer 128 Kbps | 37.54 | 37.36 |
| Dancer 40 Kbps | 31.36 | 31.39 |
| Foreman 128 Kbps | 35.10 | 34.91 |
| Foreman 40 Kbps | 30.53 | 30.51 |
| Mean | 33.98 | 33.90 |

Figure 12:
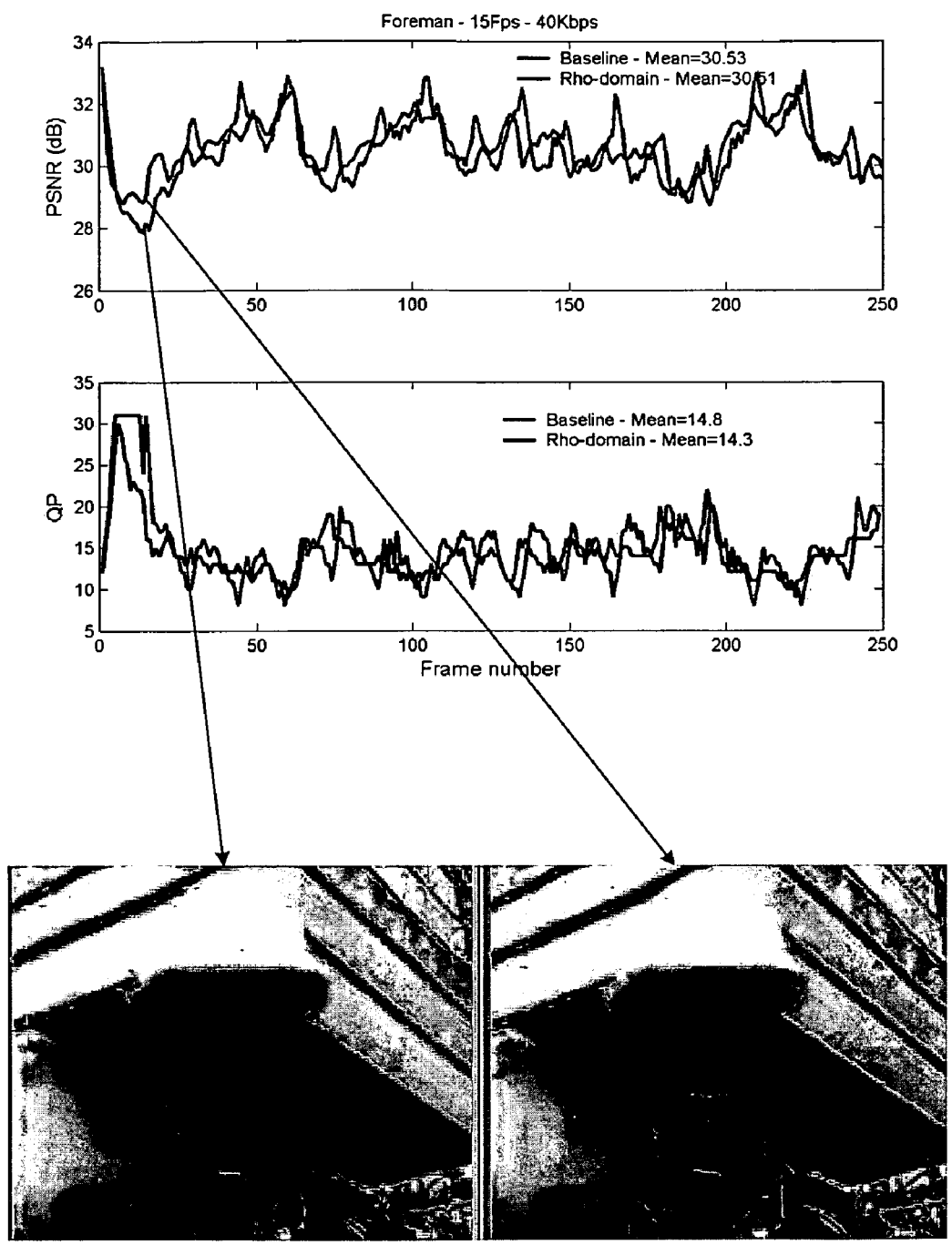
FIG. 12 includes graphs and corresponding video frames illustrating that that the significant reduction in frame-level bit-rate variance caused by the $\rho$-domain rate control does not result in any degradation in the quality of encoded video sequences.

FIG. 12 further illustrates that the significant reduction in frame-level bit-rate variance caused by the ρ-domain rate control does not result in any degradation in the quality of encoded video sequences. While is has already been shown that by the use of ρ-domain method a tighter rate control is achieved, from FIG. 12 it can be observed that the ρ-domain rate control is also able to maintain a lower QP value. On an average, this does not increase the PSNR. Moreover, variation in quality may be reduced by the proposed rate-control scheme.

Various embodiments have been described. In particular, it has been demonstrated that the ρ-domain rate control yields excellent results reducing the variance in bits per frame by 50 to 80% in comparison with a conventional baseline method. It is also shown that this reduction in bit-rate fluctuation is without any degradation in PSNR and perceived picture quality. A number of techniques have also been described that can simplify the generation of a ρ-QP LUT, including a threshold approach in which a threshold-QP LUT is created and then used to create the ρ-QP LUT.

The techniques described herein may be implemented in hardware, software, firmware, or any combination thereof. If implemented in software, the techniques may be directed to a computer readable medium comprising program code, that when executed in a device that encodes video sequences, performs one or more of the methods mentioned above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components to accelerate the encoding process. In other cases, the video encoder may be implemented as a microprocessor, one or more application specific integrated circuits (ASICs), one or more field programmable gate arrays (FPGAs), or some other hardware-software combination. These and other embodiments are within the scope of the following claims.

The invention claimed is:

1. A video encoding device comprising:
   an encoder that calculates thresholds for un-quantized coefficients of a video block, wherein the thresholds identify when quantized coefficients become non-zero for different quantization parameters (QP's), and generates a ρ-QP look-up table (LUT) mapping numbers of non-zero coefficients after quantization (ρ's) to the QP's using the thresholds; and
   a memory that stores the ρ-QP LUT.

2. The video encoding device of claim 1, wherein the encoder selects a QP for rate controlled video encoding of the video block using the ρ-QP LUT.

3. The video encoding device of claim 2, wherein the encoder quantizes the coefficients of the video block based on the selected QP and encodes the video block according to an inter-frame video encoding technique.

4. The video encoding device of claim 1, wherein the encoder:
   generates a threshold-QP LUT mapping the thresholds to QP's; and
   generates the ρ-QP LUT using the threshold-QP LUT,
   wherein the memory stores the threshold-QP LUT and the ρ-QP LUT.

5. The video encoding device of claim 4, wherein the encoder generates the threshold-QP LUT by accumulating thresholds for the QP's from a largest QP to a smallest QP.

6. The video encoding device of claim 4, wherein a given threshold ($T_i$) is such that:

$$\text{for all } QP > T_i, Q(C_i, QP) = 0 \text{ and}$$

$$\text{for all } QP \leq T_i, Q(C_i, QP) \neq 0,$$

wherein $Q(C_i, QP)$ represents a quantization operation of a given coefficient $C_i$ using the quantization parameter QP.

7. The video encoding device of claim 1, wherein the encoder generates different ρ-QP LUTs for different video blocks of a video frame and selects a QP for rate controlled video encoding of a given video block using a corresponding ρ-QP LUT for the given video block.

8. The video encoding device of claim 1, wherein the encoder generates different ρ-QP LUTs for different video frames of a video sequence and selects a QP for rate controlled video encoding of video blocks of a given video frame using a corresponding ρ-QP LUT for the given video frame.

9. The video encoding device of claim 1, wherein a total number of computations required by the encoder to generate the ρ-QP LUT is approximately 2N+M, where N represents a number of coefficients and M represents a number of possible values of QP.

10. A method of providing rate control for video encoding comprising:
    calculating thresholds for un-quantized coefficients of a video block wherein the thresholds identify when quantized coefficients become non-zero for different quantization parameters (QP's); and
    generating a ρ-QP look-up table (LUT) mapping numbers of non-zero coefficients after quantization (ρ's) to the QP's using the thresholds.

11. The method of claim 10, further comprising selecting a QP for rate controlled video encoding of the video block using the ρ-QP LUT.

12. The method of claim 11, further comprising quantizing the coefficients of the video block based on the selected QP and encoding the video block according to an inter-frame video encoding technique.

13. The method of claim 10, further comprising:
    generating a threshold-QP LUT mapping the thresholds to quantization parameters (QP's); and
    generating the ρ-QP LUT using the threshold-QP LUT.

14. The method of claim 13, wherein generating the threshold-QP LUT comprises accumulating thresholds for the quantization parameters (QP's) from a largest QP to a smallest QP.

15. The method of claim 10, further comprising generating different ρ-QP LUTs for different video blocks of a video frame and selecting a QP for rate controlled video encoding of a given video block using a corresponding ρ-QP LUT for the given video block.

16. The method of claim 10, further comprising generating different ρ-QP LUTs for different video frames of a video sequence and selecting a QP for rate controlled video encoding of video blocks of a given video frame using a corresponding ρ-QP LUT for the given video frame.

17. The method of claim 10, wherein a given threshold ($T_i$) is such that:

$$\text{for all } QP > T_i, Q(C_i, QP) = 0 \text{ and}$$

$$\text{for all } QP \leq T_i, Q(C_i, QP) \neq 0,$$

wherein $Q(C_i, QP)$ represents a quantization operation of a given coefficient $C_i$ using the quantization parameter QP.

18. The method of claim 10, wherein a total number of computations required to generate the ρ-QP LUT is approximately 2N+M, where N represents a number of coefficients and M represents a number of possible values of QP.

19. An apparatus comprising:
    means for calculating thresholds for un-quantized coefficients of a video block wherein the thresholds identify when quantized coefficients become non-zero for different quantization parameters (QP's); and
    means for generating a ρ-QP look-up table (LUT) mapping numbers of non-zero coefficients after quantization (ρ's) to the QP's using the thresholds.

20. The apparatus of claim 19, further comprising means for selecting a QP for rate controlled video encoding of the video block using the ρ-QP LUT.

21. The apparatus of claim 20, further comprising means for quantizing the coefficients of the video block based on the selected QP and encoding the video block according to an inter-frame video encoding technique.

22. The apparatus of claim 19, further comprising:
    means for generating a threshold-QP LUT mapping the thresholds to quantization parameters (QP's); and
    means for generating the ρ-QP LUT using the threshold-QP LUT.

23. The apparatus of claim 22, wherein means for generating the threshold-QP LUT comprises means for accumulating thresholds for the quantization parameters (QP's) from a largest QP to a smallest QP.

24. The apparatus of claim 22, wherein a given threshold ($T_i$) is such that:

$$\text{for all } QP > T_i, Q(C_i, QP) = 0 \text{ and}$$

$$\text{for all } QP \leq T_i, Q(C_i, QP) \neq 0,$$

wherein $Q(C_i, QP)$ represents a quantization operation of a given coefficient $C_i$ using the quantization parameter QP.

25. The apparatus of claim 19, further comprising means for generating different ρ-QP LUTs for different video blocks of a video frame and means for selecting a QP for rate controlled video encoding of a given video block using a corresponding ρ-QP LUT for the given video block.

26. The apparatus of claim 19, further comprising means for generating different ρ-QP LUTs for different video frames of a video sequence and means for selecting a QP for rate controlled video encoding of video blocks of a given video frame using a corresponding ρ-QP LUT for the given video frame.

27. The apparatus of claim 19, wherein a total number of computations required to generate the ρ-QP LUT is approximately 2N+M, where N represents a number of coefficients and M represents a number of possible values of QP.

28. The apparatus of claim 19, wherein the means for calculating thresholds for un-quantized coefficients of a video block comprises software executing on a digital signal processor.

29. The apparatus of claim 19, wherein the means for calculating thresholds for un-quantized coefficients of a video block comprises firmware.

30. The apparatus of claim 19, wherein the means for calculating thresholds for un-quantized coefficients of a video block comprises hardware.

31. The apparatus of claim 30, wherein the means for generating a ρ-QP LUT comprises software executing on a digital signal processor.

32. A computer-readable medium storing computer-executable code for causing a computer to provide rate control for video encoding comprising:
    code for casuing a computer to calculate thresholds for un-quantized coefficients of a video block wherein the thresholds identify when quantized coefficients become non-zero for different quantization parameters (QP's); and
    code for casuing a computer to generate a ρ-QP look-up table (LUT) mapping numbers of non-zero coefficients after quantization (ρ's) to the QP's using the thresholds.

33. The computer-readable medium of claim 32, further comprising code for casuing a computer to select a QP for rate controlled video encoding of the video block using the ρ-QP LUT.

34. The computer-readable medium of claim 33, further comprising code for casuing a computer to quantize the coefficients of the video block based on the selected QP and code for casuing a computer to encode the video block according to an inter-frame video encoding technique.

35. The computer-readable medium of claim 32, further comprising:
    code for castling a computer to generate a threshold-QP LUT mapping the thresholds to quantization parameters (QP's); and
    code for casuing a computer to generate the ρ-QP LUT using the threshold-QP LUT.

36. The computer-readable medium of claim 35, wherein the code for casuing a computer to generate the threshold-QP LUT comprises code for casuing a computer to accumulate thresholds for the quantization parameters (QP's) from a largest QP to a smallest QP.

37. The computer-readable medium of claim 32, further comprising code for casuing a computer to generate different ρ-QP LUTs for different video blocks of a video frame and code for casuing a computer to selecte a QP for rate controlled video encoding of a given video block using a corresponding ρ-QP LUT for the given video block.

38. The computer-readable medium of claim 32, further comprising code for casuing a computer to generate different ρ-QP LUTs for different video frames of a video sequence and code for casuing a computer to select a QP for rate controlled video encoding of video blocks of a given video frame using a corresponding ρ-QP LUT for the given video frame.

39. The computer-readable medium of claim 32, wherein a given threshold ($T_i$) is such that:

$$\text{for all } QP > T_i, Q(C_i, QP) = 0 \text{ and}$$

$$\text{for all } QP \leq T_i, Q(C_i, QP) \neq 0,$$

wherein $Q(C_i, QP)$ represents a quantization operation of a given coefficient $C_i$ using the quantization parameter QP.

40. The computer-readable medium of claim 32, wherein a total number of computations required to generate the ρ-QP LUT is approximately 2N+M, where N represents a number of coefficients and M represents a number of possible values of QP.

\* \* \* \* \*

UNITED STATES PATENT AND TRADEMARK OFFICE
CERTIFICATE OF CORRECTION

PATENT NO. : 7,606,427 B2 Page 1 of 1
APPLICATION NO. : 11/019331
DATED : October 20, 2009
INVENTOR(S) : Malayath et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this

Twelfth Day of October, 2010

David J. Kappos
*Director of the United States Patent and Trademark Office*